(12) United States Patent
Ido et al.

(10) Patent No.: US 9,756,689 B2
(45) Date of Patent: Sep. 5, 2017

(54) LIGHT OUTPUT CONTROL DEVICE, ILLUMINATION SYSTEM, AND FACILITY APPARATUS

(71) Applicant: Panasonic Intellectual Property Management Co., Ltd., Osaka (JP)

(72) Inventors: Shigeru Ido, Osaka (JP); Katsuhiko Ishikawa, Nara (JP); Hirohiko Nojiri, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/232,522

(22) Filed: Aug. 9, 2016

(65) Prior Publication Data

US 2017/0064783 A1    Mar. 2, 2017

(30) Foreign Application Priority Data

Aug. 25, 2015 (JP) ................. 2015-165999

(51) Int. Cl.
*H05B 33/08* (2006.01)
*A47F 3/00* (2006.01)
(Continued)

(52) U.S. Cl.
CPC ......... *H05B 33/0815* (2013.01); *A47F 3/001* (2013.01); *A47F 3/0469* (2013.01);
(Continued)

(58) Field of Classification Search
CPC .............. H05B 33/083; H05B 33/0815; H05B 33/0845; H05B 33/0887
See application file for complete search history.

(56) References Cited

U.S. PATENT DOCUMENTS

2012/0081009 A1* 4/2012 Shteynberg .......... H05B 33/083
                                                                315/122
2012/0262082 A1  10/2012 Esaki et al.
(Continued)

FOREIGN PATENT DOCUMENTS

JP         2000-188187 A      7/2000
JP         2005-332586 A     12/2005
(Continued)

*Primary Examiner* — Douglas W Owens
*Assistant Examiner* — Pedro C Fernandez
(74) *Attorney, Agent, or Firm* — Renner, Otto, Boisselle & Sklar, LLP

(57) ABSTRACT

A light output control device includes a switching device, multiple signal input ports, a signal selection circuit, and a control circuit. The switching device is to be electrically connected between a direct-current power supply and a light source circuit. The light source circuit includes a semiconductor light emitting element. The multiple signal input ports respectively correspond to multiple kinds of light output control signals. The signal selection circuit selects, when receiving two or more light output control signals indicating different light output levels through the multiple signal input ports, a light output control signal indicating a lowest (or highest) light output level, from the two or more light output control signals. The control circuit performs switching control of the switching device with a duty cycle corresponding to the lowest (or highest) light output level indicated by the light output control signal selected by the signal selecting circuit.

16 Claims, 10 Drawing Sheets

(51) Int. Cl.
    *A47F 3/04*       (2006.01)
    *F21V 15/01*     (2006.01)
    *F21V 33/00*     (2006.01)
    *F21Y 115/10*    (2016.01)
    *F25D 27/00*     (2006.01)

(52) U.S. Cl.
    CPC .......... *F21V 15/01* (2013.01); *F21V 33/0044* (2013.01); *H05B 33/083* (2013.01); *H05B 33/0845* (2013.01); *H05B 33/0887* (2013.01); *F21Y 2115/10* (2016.08); *F25D 27/005* (2013.01)

(56) References Cited

U.S. PATENT DOCUMENTS

2013/0221875 A1*   8/2013   Liao .................... H05B 33/0815
                                                         315/307
2014/0232268 A1*   8/2014   Kamoi ............... H05B 33/0854
                                                         315/117

FOREIGN PATENT DOCUMENTS

| JP | 2008-210536 A | 9/2008 |
| JP | 2011-258517 A | 12/2011 |
| JP | 2012-226924 A | 11/2012 |
| JP | 2014-049244 A | 3/2014 |

\* cited by examiner

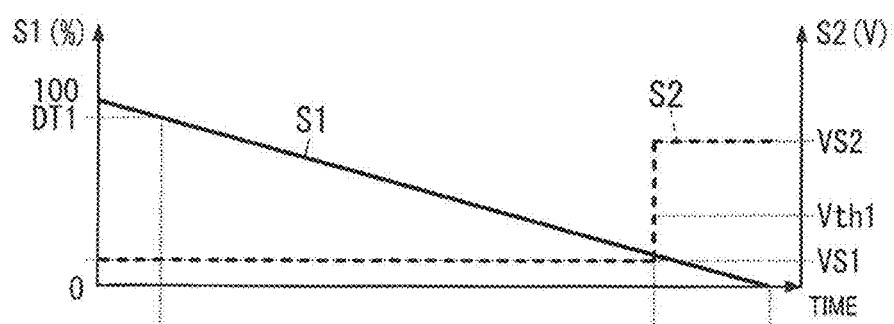
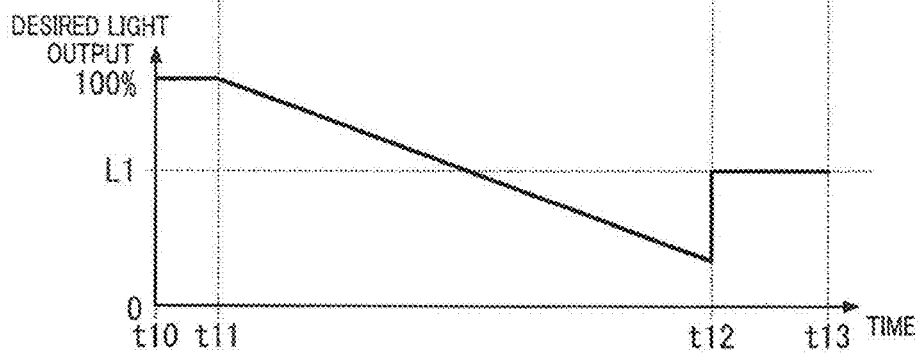

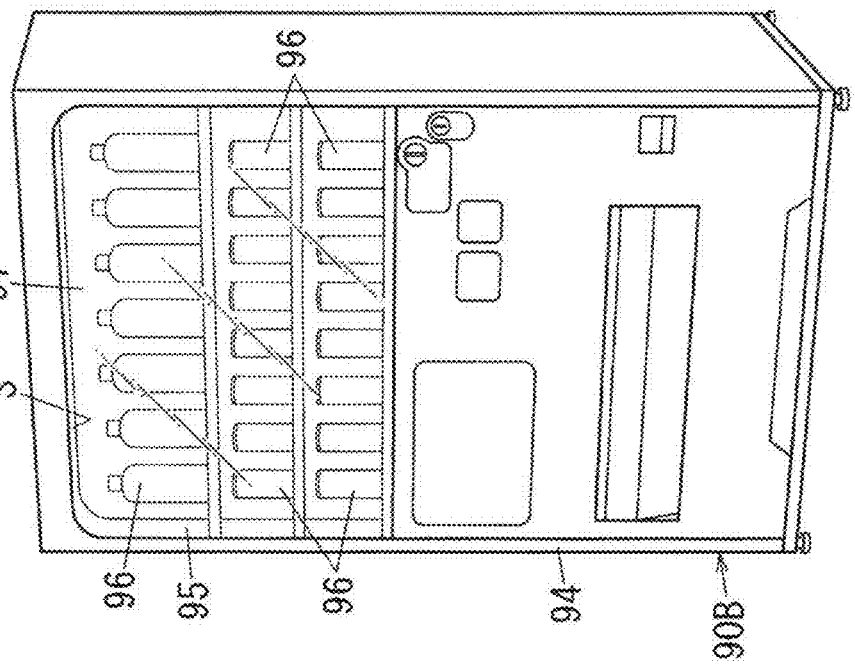
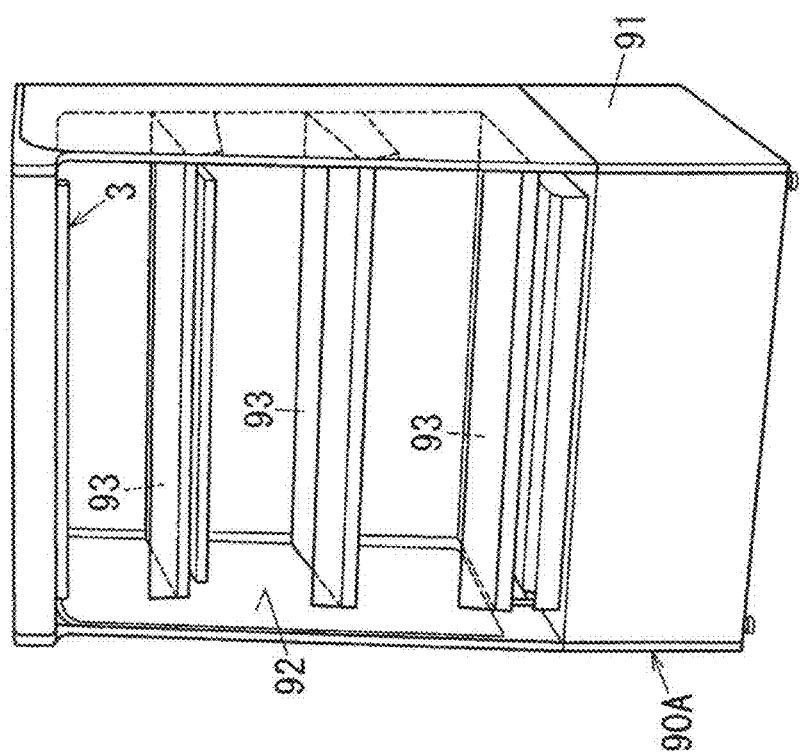

LIGHT OUTPUT CONTROL DEVICE, ILLUMINATION SYSTEM, AND FACILITY APPARATUS

CROSS-REFERENCE TO RELATED APPLICATION

The present application is based upon and claims the benefit of priority of Japanese Patent Application No. 2015-165999, filed on Aug. 25, 2015, the entire contents of which are incorporated herein by reference.

TECHNICAL FIELD

The present disclosure relates generally to light output control devices, illumination systems, and facility apparatuses, and particularly to a light output control device for lighting a semiconductor light emitting element with a desired light output level, and an illumination system and a facility apparatus including the same.

BACKGROUND ART

There has been proposed a light emitting diode (LED) power supply device that can adjust the brightness and the color temperature of light emitted from an LED module (JP 2012-226924 A, hereinafter referred to as Document 1). The LED power supply device of Document 1 includes the LED module and a power supply device. The LED module includes a first light emitting unit for emitting first color light and a second light emitting unit for emitting second color light. The power supply device supplies an electric current to cause the LED module to emit light. The power supply device includes a constant current output circuit, a color temperature control circuit, and a control circuit. The control circuit receives a light output control signal and a color temperature signal from an external dimmer. The light output control signal is a pulse width modulation (PWM) signal, and indicates a desired brightness by the duty cycle. The color temperature signal is a PWM signal, and indicates a desired color temperature by the duty cycle. The control circuit adjusts the brightness (light output) of the LED module by controlling the current outputted from the constant current output circuit based on the light output control signal. Also, the control circuit adjusts the color temperature of light emitted from the LED module by controlling a blinking cycle of the first light emitting unit and a blinking cycle of the second light emitting unit based on the color temperature signal.

The LED power supply device disclosed in Document 1 can receive and handle the light output control signal represented by the PWM signal indicating a desired brightness by the duty cycle. However, the LED power supply device of Document 1 cannot handle the light output control signal represented by a signal other than the PWM signal. That is, the LED power supply device of Document 1 cannot cooperate with a dimmer that outputs a light output control signal represented by a signal other than the PWM signal.

SUMMARY

An objective of the present disclosure is to provide a light output control device, an illumination system, and a facility apparatus capable of handling multiple kinds of light output control signals.

A light output control device according to an aspect of the present disclosure includes a switching device, multiple signal input ports, a signal selection circuit, and a control circuit. The switching device is to be electrically connected between a direct-current power supply and a light source circuit. The light source circuit includes a semiconductor light emitting element. The multiple signal input ports respectively correspond to multiple kinds of light output control signals. The signal selection circuit is configured to, when receiving two or more light output control signals indicating different light output levels through the multiple signal input ports, select a light output control signal indicating a lowest light output level, from the two or more light output control signals. The control circuit is configured to perform switching control of the switching device with a duty cycle corresponding to the lowest light output level indicated by the light output control signal selected by the signal selecting circuit.

A light output control device according to another aspect of the present disclosure includes a switching device, multiple signal input ports, a signal selection circuit, and a control circuit. The switching device is to be electrically connected between a direct-current power supply and a light source circuit. The light source circuit includes a semiconductor light emitting element. The multiple signal input ports respectively correspond to multiple kinds of light output control signals. The signal selection circuit is configured to, when receiving two or more light output control signals indicating different light output levels through the multiple signal input ports, select a light output control signal indicating a highest light output level, from the two or more light output control signals. The control circuit is configured to perform switching control of the switching device with a duty cycle corresponding to the highest light output level indicated by the light output control signal selected by the signal selecting circuit.

An illumination system according to another aspect of the present disclosure includes any of the light output control devices of the above, and the light source circuit including the semiconductor light emitting element.

A facility apparatus according to another aspect of the present disclosure includes any of the light output control devices of the above, the light source circuit including the semiconductor light emitting element, and the facility apparatus body that holds the light source circuit and the light output control device.

BRIEF DESCRIPTION OF THE DRAWINGS

The figures depict one or more implementations in accordance with the present teaching, by way of example only, not by way of limitations. In the figures, like reference numerals refer to the same or similar elements.

FIG. 11A is a graph illustrating a time variation of the duty cycle of the light output control signal S1 and the voltage level of the light output control signal S2 according to an operation example of the signal selection circuit. FIG. 11B is a graph illustrating a time variation of a desired light output indicated by a light output control signal S3 generated by the signal selection circuit according to the operation example.

FIG. 12A is a perspective view of a facility apparatus according to Embodiment 3 of the present disclosure. FIG. 12B is a perspective view of a facility apparatus according to a modification of Embodiment 3.

DETAILED DESCRIPTION

Embodiments 1 to 3 described hereinafter are given as examples of embodiments of the present disclosure, and the embodiments of the present disclosure are not limited to Embodiments 1 to 3 described below. Embodiments 1 to 3 can be modified appropriately in their designs and the like as long as the modifications can achieve the object of the present disclosure.

Embodiment 1

A light output control device and an illumination system according to Embodiment 1 will be explained with reference to FIG. 1 to FIG. 8.

(1.1) Structure of Illumination System

Figure 1:
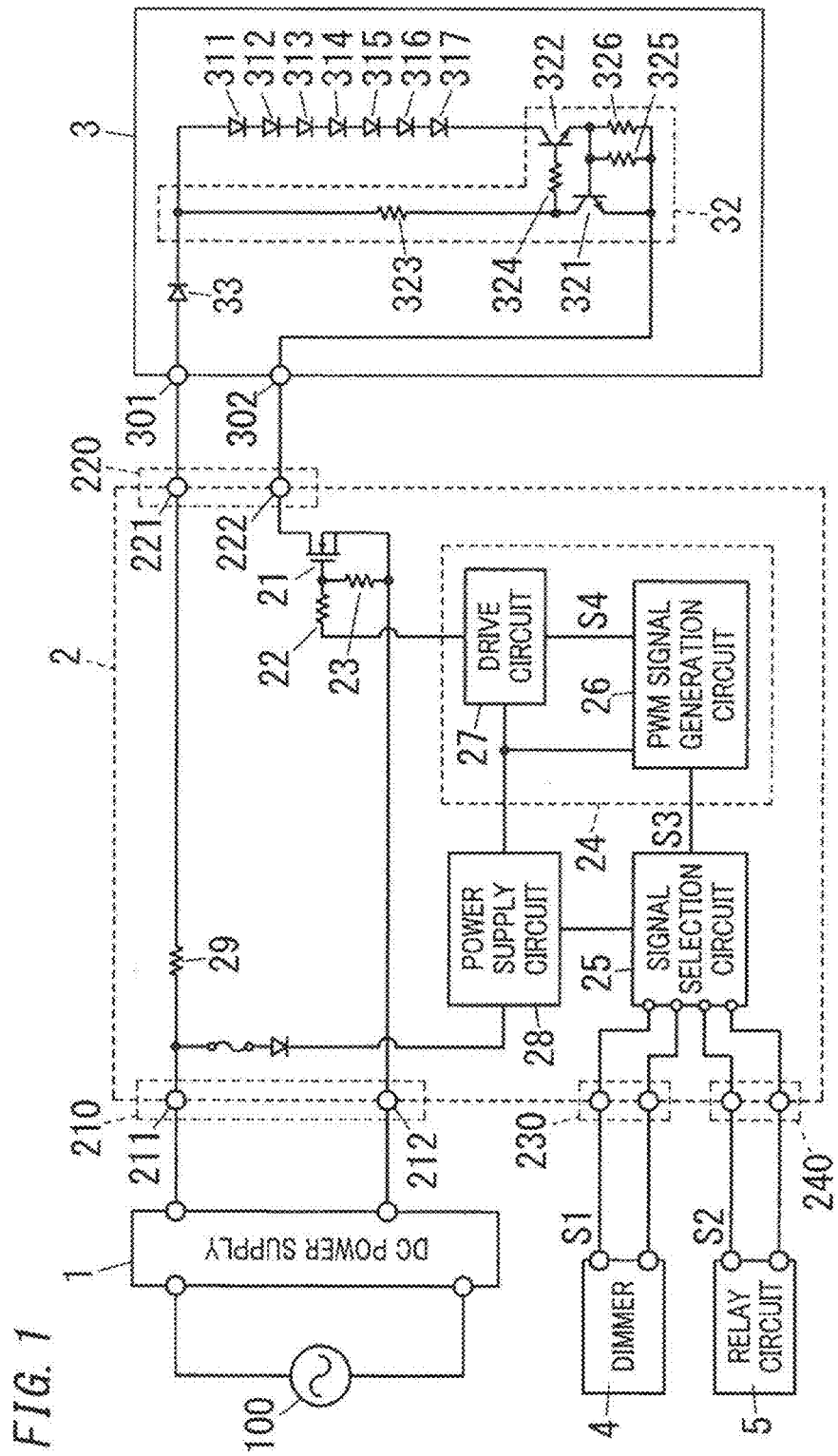
FIG. 1 is a circuit diagram of an illumination system according to Embodiment 1 of the present disclosure.
Figure 2:
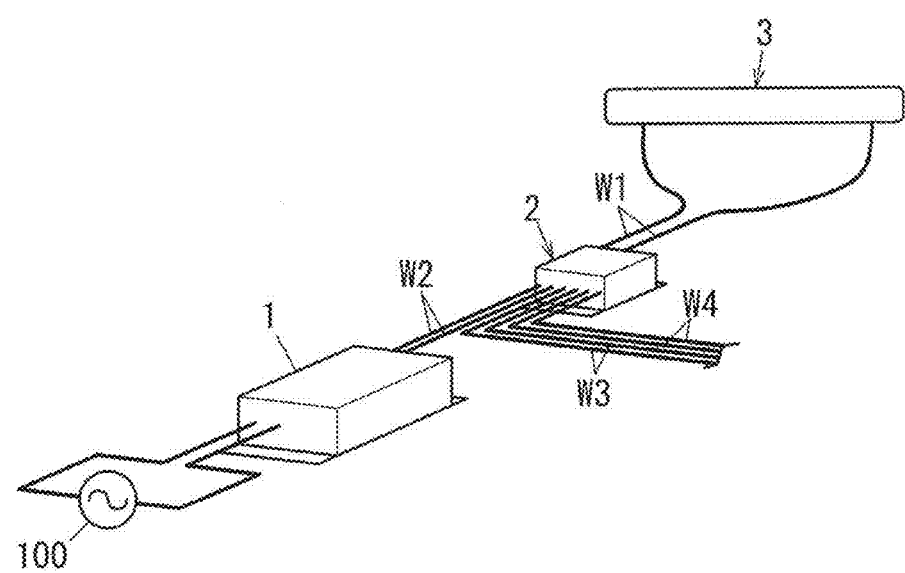
FIG. 2 is a schematic configuration diagram of the illumination system.

FIG. 1 is a circuit diagram of the illumination system. FIG. 2 is a schematic configuration diagram of the illumination system.

The illumination system of the present embodiment includes a direct-current (DC) power supply 1, a light output control device 2, and a light source circuit 3. In the illumination system of the present embodiment, the light output control device 2 is connected between the DC power supply 1 and the light source circuit 3. The light output control device 2 is connected to the light source circuit 3 through electric wires W1. The light output control device 2 is connected to the DC power supply 1 through electric wires W2. The light output control device 2 is connected to an external dimmer 4 through electric wires W3, and is connected to a relay circuit 5 through electric wires W4.

The DC power supply 1 converts an AC voltage inputted from an AC power supply 100 such as a commercial power supply (for example, AC voltage in a range of 100 to 242 V) into a constant DC voltage and outputs the resultant DC voltage. The DC power supply 1 may be a known switching regulator. The DC power supply 1 outputs a DC voltage having a voltage value (DC 24 V, for example) allowing the light source circuit 3 to light.

The light source circuit 3 includes seven light emitting diodes 311 to 317 each of which is a semiconductor light emitting element, a constant current circuit 32, and a diode 33 for preventing reverse current. The constant current circuit 32 keeps the current flowing through the light emitting diodes 311 to 317 constant. The constant current circuit 32 includes NPN transistors 321 and 322, and resistors 323 to 326. The light source circuit 3 includes the light emitting diodes 311 to 317 serving as the semiconductor light emitting elements, but is not limited thereto. For example, the light source circuit 3 may include, as the semiconductor light emitting element, an organic electro luminescence (EL) element(s) or the like, instead of the light emitting diodes 311 to 317.

The light source circuit 3 includes a pair of connection terminals 301 and 302. The positive electrode side connection terminal 301 is connected to an anode of the diode 33. The diode 33 has a cathode connected to a collector of the transistor 321 through the resistor 323. The transistor 321 has an emitter connected to the negative electrode side connection terminal 302. The collector of the transistor 321 is also connected to a base of the transistor 322 through the resistor 324. The transistor 322 has an emitter connected to a base of the transistor 321. The resistors 325 and 326 are connected in parallel to form a parallel circuit which is connected between the emitter of the transistor 322 and the emitter of the transistor 321. The seven light emitting diodes 311 to 317 are connected in series between the cathode of the diode 33 and a collector of the transistor 322 so as to allow a current to flow in a direction same as a direction in which the current flow through the diode 33.

The light output control device 2 includes a switching device 21, resistors 22, 23 and 29, a control circuit 24, a signal selection circuit 25, and a power supply circuit 28. The control circuit 24 includes a pulse width modulation (PWM) signal generation circuit 26 and a drive circuit 27.

The light output control device 2 includes a power supply connection port 210, a light source connection port 220, and two signal input ports 230 and 240. The power supply connection port 210 is connected to the DC power supply 1. Specifically, the power supply connection port 210 includes a pair of connection terminals 211 and 212. The connection terminal 211 is connected to a positive electrode side output terminal of the DC power supply 1. The connection terminal 212 is connected to a negative electrode side output terminal of the DC power supply 1. The light source connection port 220 is connected to the light source circuit 3. Specifically, the light source connection port 220 includes a pair of connection terminals 221 and 222. The positive electrode side connection terminal 221 is connected to the connection terminal 301 of the light source circuit 3. The negative electrode side connection terminal 222 is connected to the connection terminal 302 of the light source circuit 3.

Different kinds of light output control signals are inputted to the two signal input ports 230 and 240. For example, the dimmer 4 is connected to the signal input port 230. The signal input port 230 receives a light output control signal (first kind of light output control signal) S1 from the dimmer 4. The light output control signal S1 is a PWM signal having a duty cycle corresponding to a desired light output level. For example, the relay circuit 5 is connected to the signal input port 240. The signal input port 240 receives a light output control signal (second kind of light output control signal) S2. The light output control signal S2 is a voltage signal with a voltage level indicative of either of two levels in accordance with whether a relay of the relay circuit 5 is on or off, for example. In a specific example, the relay circuit 5 includes: a first resistor (not shown) connected between a pair of terminals of the signal input port 240; a second resistor (not shown) and a DC power supply (not shown) connected in series to form a series circuit connected between both ends of the first resistor; and the relay connected between both ends of the second resistor. The different kinds of light output control signals means light output control signals having different kinds of parameters indicating the desired light output level. In the present embodiment, the parameter of the light output control signal S1 is the duty ratio of the PWM signal, and the parameter of the light output control signal S2 is the voltage level of the voltage signal. In other words, the different kinds of light output control signals indicate the desired light output levels in different manners (e.g., by use of different kinds of parameters).

The connection terminal 211 and the connection terminal 221 are electrically connected to each other through the resistor 29.

The switching device 21 is a metal oxide semiconductor field effect transistor (MOSFET) for example, and has a drain connected to the connection terminal 222. The switching device 21 has a source connected to the connection terminal 212. The resistor 23 is connected between a gate and the source of the switching device 21. The switching device 21 is not limited to the MOSFET, but may be a junction field effect transistor (JFET) or a bipolar transistor such as an insulated gate bipolar transistor (IGBT).

The signal selection circuit 25 is connected to the two signal input ports 230 and 240. The signal selection circuit 25 receives the light output control signal S1 from the dimmer 4 and the light output control signal S2 from the relay circuit 5.

Figure 3:
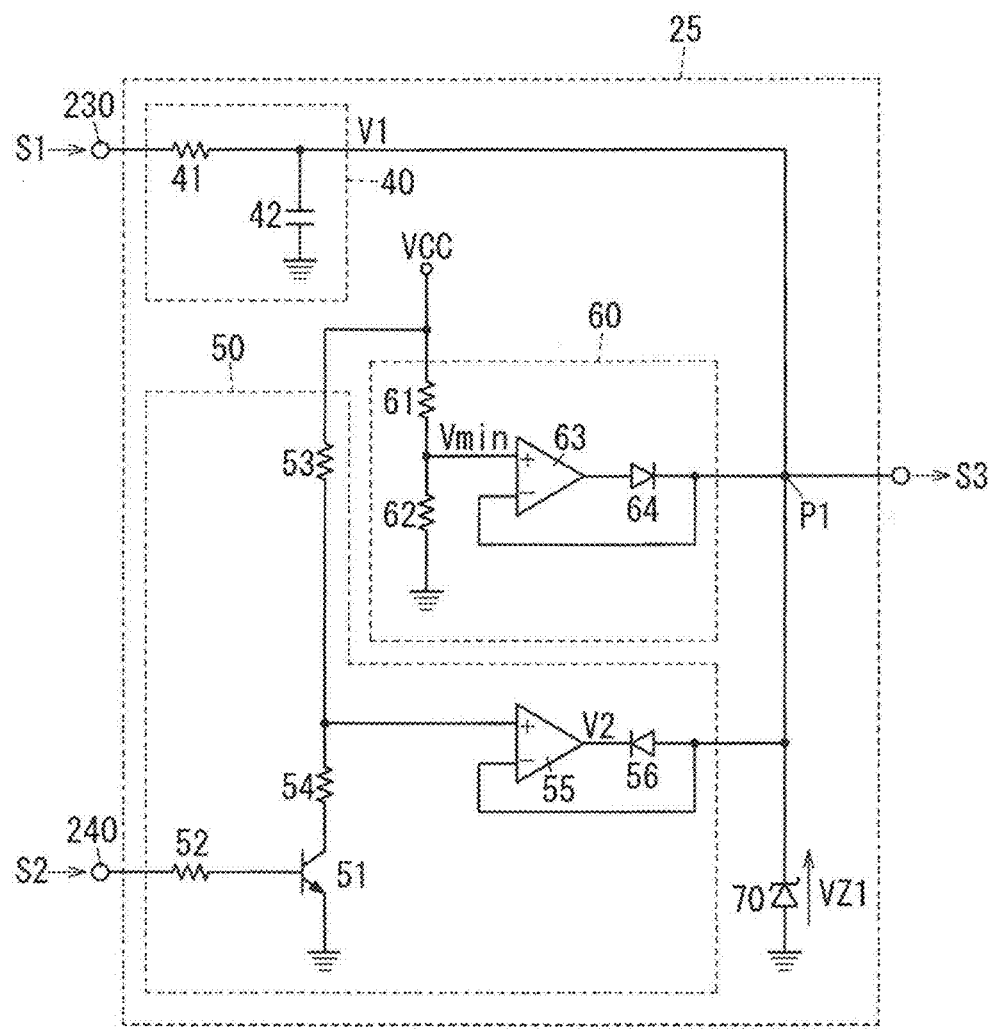
FIG. 3 is a circuit diagram of a signal selection circuit in a light output control device according to Embodiment 1.

Hereinafter, a circuit structure of the signal selection circuit 25 is explained based on a circuit diagram of FIG. 3. The circuit structure of the signal selection circuit 25 shown in FIG. 3 is one example, and the circuit structure of the signal selection circuit 25 is not limited to that shown in FIG. 3.

The signal selection circuit 25 includes a first conversion circuit 40, a second conversion circuit 50, a lower limit setting circuit 60, and a zener diode 70 for setting an upper limit.

The first conversion circuit 40 includes a resistor 41 and a capacitor 42, and functions as an integration circuit. The first conversion circuit 40 receives the light output control signal S1 through the signal input port 230 and smooths the light output control signal S1. As a result, the first conversion circuit 40 outputs a DC voltage having a voltage value corresponding to a duty cycle of the light output control signal S1. The first conversion circuit 40 has an output end connected to an output end P1 of the signal selection circuit 25. That is, the first conversion circuit 40 is configured to convert the light output control signal S1 into a conversion value which is represented by a physical amount and has a magnitude (voltage value) corresponding to a light output level indicated by the light output control signal S1. Specifically, the first conversion circuit 40 is configured to convert a PWM signal serving as the light output control signal S1 into a conversion value which is represented by a DC voltage and has a voltage value corresponding to a duty cycle of the light output control signal S1.

In the embodiment, the light output control signal S1 is a PWM signal having a duty cycle corresponding to a setting value for light output level of the light source circuit 3. In the embodiment, the setting value for light output level means a desired light output level of the light source circuit 3, and is expressed in percentage. For example, when the setting value for light output level is 100%, the light source circuit 3 emits light with a light output equal to a light output of light emitted when the light source circuit 3 is supplied with a rated current. That is, the light output level of the light source circuit 3 when the rated current is supplied to the light source circuit 3 is defined as 100%. For example, when the setting value for light output level is 0%, the light source circuit 3 is turned off (does not emit light). That is, the light output level of the light source circuit 3 when the light source circuit 3 is turned off is defined as 0%.

Figure 4A:
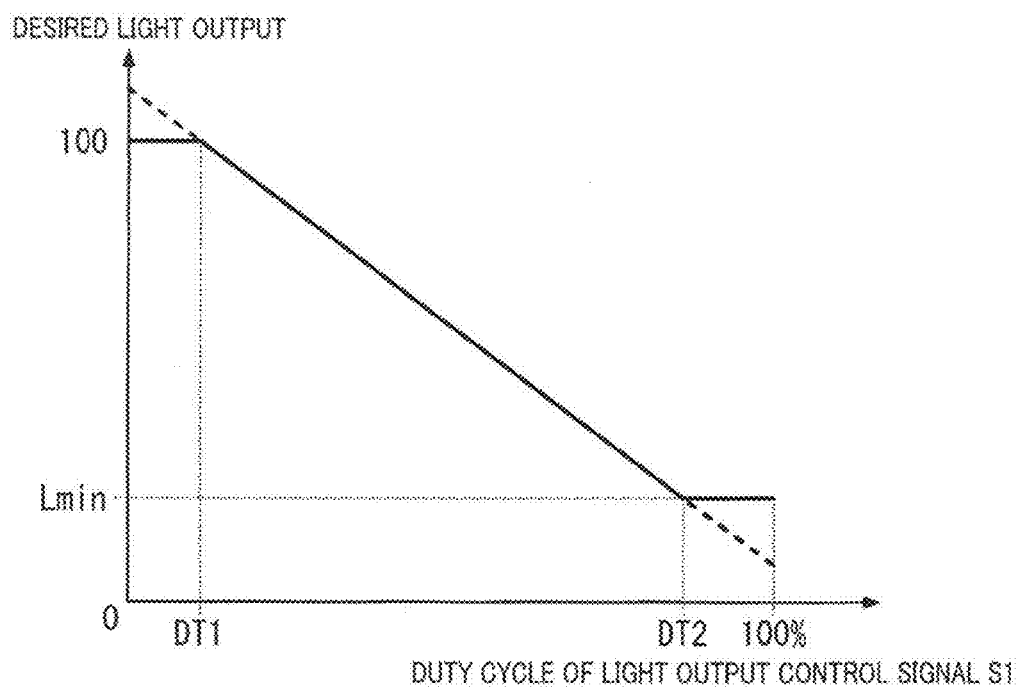
FIG. 4A is a graph illustrating a relation between a desired light output and a duty cycle according to a light output control signal S1 of the light output control device of Embodiment 1.

The light output control signal S1 of the present embodiment is defined so that the minimum of the magnitude (duty cycle) of the light output control signal S1 corresponds to the maximum of the setting value for light output level. FIG. 4A is a graph illustrating a relation between the setting value for light output level (desired light output) and the duty cycle of the light output control signal S1. The setting value for light output level decreases in direct proportion to the duty cycle of the light output control signal S1. Therefore, the setting value for light output level decreases and also the light output of the light source circuit 3 decreases with an increase in the duty cycle of the light output control signal S1.

In short, with regard to the light output control signal S1 (in other words, when only the light output control signal S1 is inputted to the light output control device 2), the light output control device 2 decreases the setting value for light output level with an increase in the duty cycle of the light output control signal S1.

In the example of FIG. 4A, the setting value for light output level changes linearly with respect to the duty cycle of the light output control signal S1, but the light output control signal S1 is not limited to this. The setting value for light output level may change nonlinearly with respect to the duty cycle of the light output control signal S1, as long as the setting value for light output level decreases with an increase in the duty cycle. It should be noted that the lower limit of the desired light output may be limited, by the lower limit setting circuit 60, to a lower limit value Lmin. The upper limit of the desired light output may be limited, by the zener diode 70, to 100% (see FIG. 4A). In the example of FIG. 4A, the light output control signal S1 with a duty cycle ranging from 0% to DT1% indicates the desired light output level of 100%. The light output control signal S1 with a duty cycle ranging from DT2% to 100% indicates the desired light output level of Lmin %.

The first conversion circuit 40 serving as the integration circuit has a cut-off frequency sufficiently lower than a frequency of the PWM signal of the light output control signal S1. Therefore, when the PWM signal as the light output control signal S1 is supplied, the first conversion circuit 40 outputs a DC voltage V1 having a voltage value corresponding to the duty cycle of the light output control signal S1. The voltage value of the DC voltage V1 increases in proportion to the duty cycle of the light output control signal S1.

The second conversion circuit 50 includes an NPN transistor 51, resistors 52 to 54, an operation amplifier 55, and a diode 56. The operation amplifier 55 has a non-inverting input terminal connected to a connection point of the resistors 53 and 54. The resistors 53 and 54 constitute a voltage divider circuit. The voltage divider circuit of the resistors 53 and 54 has a high voltage side terminal to which a constant DC voltage Vcc is supplied from the power supply circuit 28. The voltage divider circuit of the resistors 53 and 54 has a low voltage side terminal connected to a collector of the transistor 51. The transistor 51 has an emitter connected to a ground of the signal selection circuit 25. The transistor 51 has a base connected to the signal input port 240 through the resistor 52. The operation amplifier 55 has an output terminal connected to a cathode of the diode 56. The operation amplifier 55 has an inverting input terminal connected to an anode of the diode 56. The anode of the diode 56 is also connected to the output end P1 of the signal selection circuit 25. The diode 56 is connected between the output terminal of the operation amplifier 55 and the output end P1 so as to allow a current to flow in a direction from the output end P1 to the output terminal of the operation amplifier 55. Therefore, when a voltage value of the output voltage V1 of the first conversion circuit 40 is equal to or greater than a voltage value of an output voltage V2 of the operation amplifier 55, the second conversion circuit 50 holds (clamps) the voltage value of the output end P1 to the voltage value of the output voltage V2 of the operation amplifier 55.

Figure 4B:
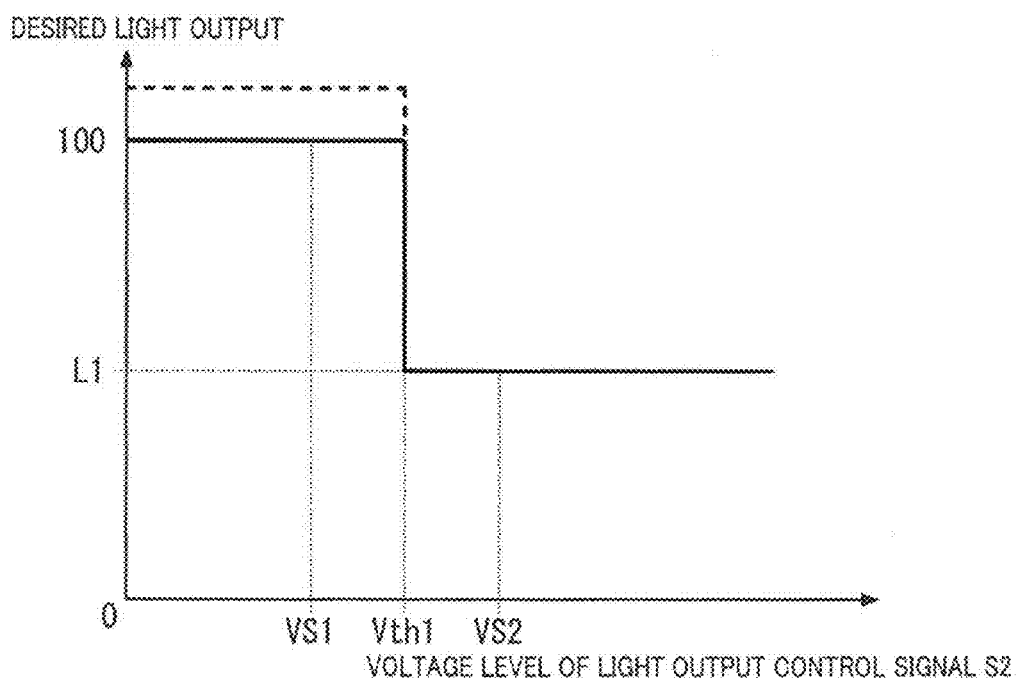
FIG. 4B is a graph illustrating a relation between a desired light output and a voltage level according to a light output control signal S2 of the light output control device of Embodiment 1.

In the embodiment, the light output control signal S2 supplied to the signal input port 240 is a voltage signal with a voltage level indicative of either of two levels in accordance with whether the relay of the relay circuit 5 is on or off. The light output control signal S2 of the present embodiment is defined so that the minimum of the magnitude (voltage level) of the light output control signal S2 corresponds to the maximum of the setting value for light output level for the light source circuit 3. FIG. 4B is a graph illustrating a relation between the light output level (desired light output) and the voltage level of the light output control signal S2. The light output control signal S2 with the voltage level lower than threshold Vth1 indicates the setting value of 100% for light output level. The light output control signal S2 with the voltage level equal to or higher than the threshold Vth1 indicates the setting value of L1% for light output level.

In the present embodiment, when the relay is turned on, the light output control signal S2 has a voltage level of VS1 (<Vth1), and the output voltage V2 of the operation amplifier 55 of the second conversion circuit 50 thus has a voltage value indicating the setting value of 100% for light output level. A state in which the light source circuit 3 emits light with a light output level of 100% may be referred to as "full-lighting state".

When the relay is turned off, the light output control signal S2 has a voltage level of VS2 (>Vth1), and the output voltage V2 of the operation amplifier 55 of the second conversion circuit 50 thus has a voltage value indicating the setting value of L1% for light output level. In the example of FIG. 4B, the setting value for light output level is switched between L1% and 100% depending on whether the voltage level of the light output control signal S2 is lower or higher than the threshold Vth1.

That is, the second conversion circuit 50 is configured to convert the light output control signal S2 into a conversion value which is represented by a physical amount and has a magnitude (voltage value) corresponding to a light output level indicated by the light output control signal S2. The second conversion circuit 50 is configured to convert the voltage signal of which voltage level is any of two or more levels serving as the light output control signal S2 into a conversion value which is represented by a DC voltage and has a voltage value corresponding to the voltage level of the light output control signal S2. Specifically, in the present embodiment, the second conversion circuit 50 is configured to convert the voltage signal of which voltage level is either of two levels serving as the light output control signal S2 into a conversion value which is represented by a DC voltage and has a voltage value corresponding to the voltage level of the light output control signal S2.

In the present embodiment, the voltage level of the light output control signal S2 is either of the first level VS1 and the second level VS2 higher than the first level VS1. The setting value for light output level (100%) corresponding to the first level VS1 is greater than the setting value for light output level (L1%) corresponding to the second level VS2.

In short, with regard to the light output control signal S2 (in other words, when only the light output control signal S2 is inputted to the light output control device 2), the light output control device 2 sets the setting value for light output level to a first setting value when the voltage level of the light output control signal S2 is lower than a threshold, and sets the setting value for light output level to a second setting value smaller than the first setting value when the voltage level of the light output control signal S2 is equal to or greater than the threshold.

Note that, there may be a hysteresis width between the threshold for the light output control signal S2 for determining whether to change the setting value for light output level from 100% to L1% and the threshold for the light output control signal S2 for determining whether to change the setting value for light output level from L1% to 100%.

The lower limit setting circuit 60 includes resistors 61 and 62 constituting a voltage divider circuit, an operation amplifier 63, and a diode 64. The power supply circuit 28 applies a constant DC voltage Vcc to a series circuit of the resistors 61 and 62. The voltage divider circuit of the resistors 61 and 62 generates a divided voltage having a voltage value of Vmin. The divided voltage is inputted to a non-inverting input terminal of the operation amplifier 63. The diode 64 has an anode connected to an output terminal of the operation amplifier 63. The diode 64 has a cathode connected to an inverting input terminal of the operation amplifier 63 and the output end P1 of the signal selection circuit 25. The diode 64 is connected between the output terminal of the operation amplifier 63 and the output end P1 so as to allow a current to flow in a direction from the output terminal of the operation amplifier 63 to the output end P1. Therefore, the lower limit setting circuit 60 keeps the lower limit of the voltage of the output end P1 not lower than the voltage value Vmin. In other words, the lower limit of a light output control signal S3 outputted from the signal selection circuit 25 is limited to the voltage value Vmin (the voltage level of the light output control signal S3 is kept equal to or higher than the voltage value Vmin).

The zener diode 70 has a cathode connected to the output end P1 of the signal selection circuit 25. The zener diode 70 has an anode connected to the ground of the signal selection circuit 25. Even when at lease one of the output voltage of the first conversion circuit 40 and the output voltage of the second conversion circuit 50 exceeds the zener voltage VZ1 of the zener diode 70, the voltage of the output end P1 is clamped to the zener voltage VZ1 by the zener diode 70. In other words, the upper limit of the light output control signal S3 outputted from the signal selection circuit 25 is limited to the zener voltage VZ1 (the voltage level of the light output control signal S3 is kept equal to or less than the zener voltage VZ1).

When the output voltage V1 of the first conversion circuit 40 becomes lower than the voltage value Vmin, the diode 64 of the lower limit setting circuit 60 allows a current to pass therethrough, and as a result the voltage of the output end P1 is kept at the voltage value Vmin. When the output voltage V1 of the first conversion circuit 40 and/or the output voltage V2 of the operation amplifier 55 of the second conversion circuit 50 become higher than the zener voltage VZ1, the voltage of the output end P1 is kept at the zener voltage VZ1 by the zener diode 70. When both the output voltages V1 and V2 are equal to or higher than the voltage value Vmin and also equal to or lower than the zener voltage VZ1, the voltage value of the light output control signal S3 of the signal selection circuit 25 corresponds to the smaller one of the output voltage V1 and the output voltage V2.

The control circuit 24 includes the PWM signal generation circuit 26 and the drive circuit 27.

The PWM signal generation circuit 26 includes a microcomputer, for example. The microcomputer executes programs stored in a read only memory (ROM) for example to perform PWM control of the switching device 21. The PWM signal generation circuit 26 generates a PWM signal S4 of which duty cycle varies in accordance with the light output control signal S3 supplied from the signal selection circuit 25, and outputs the generated PWM signal S4 to the drive circuit 27.

The drive circuit 27 has an output terminal connected to a first end of the resistor 22. The resistor 22 has a second end connected to a gate of the switching device 21. The drive circuit 27 performs switching control of the switching device 21 in accordance with a signal level of the PWM signal S4 supplied from the PWM signal generation circuit 26. For example, the drive circuit 27 turns on the switching device 21 when the signal level of the PWM signal S4 indicates a high level. The drive circuit 27 turns off the switching device 21 when the signal level of the PWM signal S4 indicates a low level.

The power supply circuit 28 converts the DC voltage having a certain voltage value (DC 24 V, for example) supplied from the DC power supply 1 into a DC voltage having a desired voltage value (DC 12 V, for example), and supplies the resultant DC voltage to the control circuit 24 and the signal selection circuit 25 (as an operating voltage).

(1.2) Explanation of Operations

Hereinafter, operations of the illumination system will be exampled.

(1.2.1) Operations of Signal Selection Circuit 25

Figure 5A:
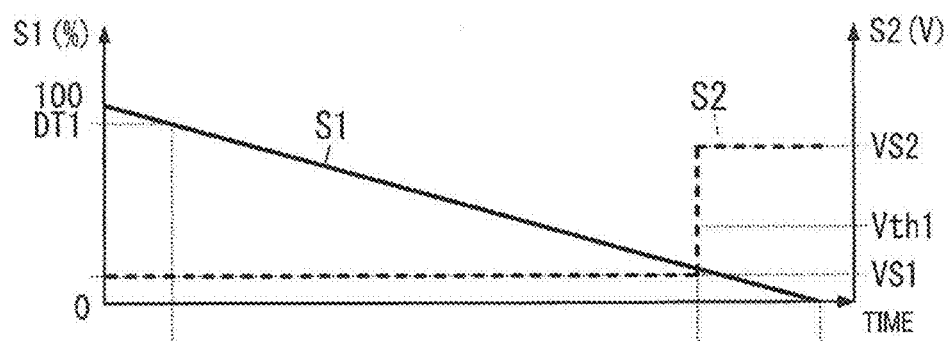
FIG. 5A is a graph illustrating a time variation of the duty cycle of the light output control signal S1 and the voltage level of the light output control signal S2 according to an operation example of the signal selection circuit.
Figure 5B:
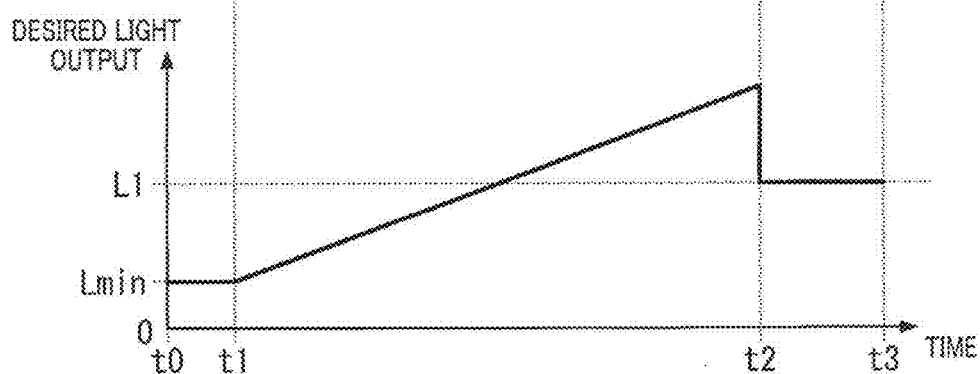
FIG. 5B is a graph illustrating a time variation of a desired light output indicated by a light output control signal S3 generated by the signal selection circuit according to the operation example.

The following explanation referring to FIG. 5A and FIG. 5B relates to an operation of the signal selection circuit 25 with the signal input port 230 and the signal input port 240 respectively receiving the light output control signal S1 from the dimmer 4 and the light output control signal S2 from the relay circuit 5.

In a period from a time point t0 to a time point t2, the relay is turned on, and the light output control signal S2 has the first level VS1. In this period, the light output level indicated by the light output control signal S2 is 100%. In a period after the time point t2, the relay is turned off, and the light output control signal S2 has the second level VS2. In this period, the light output level indicated by the light output control signal S2 is L1%.

At the time point t0, the duty cycle of the light output control signal S1 is set to 100%. The duty cycle of the light output control signal S1 gradually decreases over time in a period between the time point t0 and a time point t3. The duty cycle of the light output control signal S1 reaches 0% at the time point t3. Therefore, the light output level indicated by the light output control signal S1 is Lmin % at the time point t0, and increases from Lmin % to 100% with a lapse of time from the time point t0 to the time point t3.

In the period from the time point t0 to the time point t2, the light output level indicated by the light output control signal S2 is lower than the light output level indicated by the light output control signal S1. In this case, the voltage value of the output voltage V1 of the first conversion circuit 40 is greater than the voltage value of the output voltage V2 of the second conversion circuit 50, and as a result the voltage value of the output end P1 of the signal selection circuit 25 is set to the voltage value of the output voltage V1 of the first conversion circuit 40. That is, the signal selection circuit 25 selects the light output control signal S1, which indicates a lower light output level of the light output control signals S1 and S2, and generates the light output control signal S3 in accordance with the light output control signal S1, and outputs the light output control signal S3 to the PWM signal generation circuit 26. In a period from the time point t0 to a time point t1, the voltage value of the output voltage V1 of the first conversion circuit 40 is smaller than the voltage value Vmin of the lower limit setting circuit 60, and thus the light output control signal S3 is set to a voltage value corresponding to the lower limit Lmin of the light output level. In a period from the time point t1 to the time point t2, the voltage value of the output voltage V1 of the first conversion circuit 40 is greater than the voltage value Vmin of the lower limit setting circuit 60, and thus the light output control signal S3 is set to a voltage value corresponding to the output voltage V1 of the first conversion circuit 40.

The relay is turned off at the time point t2. In the period after the time point t2, the light output level indicated by the light output control signal S2 is higher than the light output level indicated by the light output control signal S1. In this case, the voltage value of the output voltage V2 of the second conversion circuit 50 is greater than the voltage value of the output voltage V1 of the first conversion circuit 40, and as a result the voltage value of the output end P1 of the signal selection circuit 25 is set to the voltage value of the output voltage V2 of the second conversion circuit 50. That is, the signal selection circuit 25 selects the light output control signal S2, which indicates a lower light output level of the light output control signals S1 and S2, and outputs a signal corresponding to the light output control signal S2. The light output control signal S3 of the signal selection circuit 25 has a voltage value corresponding to the light output control signal S2.

In summary, when the two light output control signals S1 and S2 are inputted to the signal selection circuit 25, the signal selection circuit 25 selects a light output control signal indicating a lower light output level from the two light output control signals S1 and S2.

In the explanation above, the two light output control signals S1 and S2 are both inputted to the signal selection circuit 25, but either one of the light output control signals S1 and S2 alone may be inputted to the signal selection circuit 25.

For example, the following explanation relates to an operation of the signal selection circuit 25 in a case where the light output control signal S1 is supplied to the signal input port 230 but the light output control signals S2 is not supplied to the signal input port 240. When the light output control signal S2 is not supplied to the signal input port 240, the voltage level of the signal input port 240 is lower than the threshold Vth1. Therefore, the output voltage V2 of the operation amplifier 55 of the second conversion circuit 50 has a voltage value indicating the setting value of 100% for light output level. In this case, the signal selection circuit 25 selects the output voltage V1, which indicates a lower light output level, from the output voltages V1 and V2, and the signal selection circuit 25 outputs the light output control signal S3 having a voltage value corresponding to the light output control signal S1.

The following explanation relates to an operation of the signal selection circuit 25 in another case where the light output control signal S2 is supplied to the signal input port 240 but the light output control signals S1 is not supplied to the signal input port 230. It is considered that a situation where the light output control signal S1 is not supplied to the signal input port 230 is equivalent to a situation where the light output control signal S1 having a duty cycle of 0% is supplied. Therefore, the output voltage V1 of the first conversion circuit 40 has a voltage value indicating the setting value of 100% for light output level. In this case, the signal selection circuit 25 selects the output voltage V2, which indicates a lower light output level, from the output voltages V1 and V2, and the signal selection circuit 25 outputs the light output control signal S3 having a voltage value corresponding to the light output control signal S2.

(1.2.2) Operation of Control Circuit 24

When the light output control signal S3 is supplied from the signal selection circuit 25 to the PWM signal generation circuit 26 of the control circuit 24, the PWM signal generation circuit 26 generates the PWM signal S4 having a duty cycle corresponding to the voltage level of the light output control signal S3.

The PWM signal generation circuit 26 outputs the PWM signal S4 to the drive circuit 27.

The drive circuit 27 performs the switching control of the switching device 21 in accordance with the PWM signal S4. As a result of the switching operation of the switching device 21, the DC voltage supplied from the DC power supply 1 is converted into a rectangular wave voltage having an amplitude equal to the voltage value of the DC voltage. The rectangular wave voltage is applied to the light source circuit 3. For example, the drive circuit 27 turns on the switching device 21 during a period in which the signal level of the PWM signal S4 indicates the high level. The drive circuit 27 turns off the switching device 21 during a period in which the signal level of the PWM signal S4 indicates the low level.

When the drive circuit 27 turns on the switching device 21, the DC voltage of the DC power supply 1 is applied to the light source circuit 3, and as a result the light emitting diodes 311 to 317 emit light. Specifically, when the switching device 21 is turned on, a voltage is applied from the DC power supply 1 to a base of the transistor 322 through the resistor 29, the diode 33, and the resistors 323 and 324 to turn on the transistor 322. As a result of turning on of the transistor 322, a current flows through the light emitting diodes 311 to 317 to allow the light emitting diodes 311 to 317 to emit light. When the current flows through the light emitting diodes 311 to 317, a voltage is generated across each resistor 325, 326. When the voltage across the resistor 325, 326 exceeds a threshold voltage of the transistor 321, the transistor 321 is turned on. When the transistor 321 is turned on, a base voltage of the transistor 322 decreases to reach a threshold voltage, and as a result the transistor 322 is turned off. The light emitting diodes 311 to 317 are turned off accordingly. When the transistor 322 is turned off, the transistor 321 is turned off as well, leading to an application of a voltage to the base of the transistor 322 to turn on the transistor 322. According to repetition of the above operations, the current flowing through the light emitting diodes 311 to 317 is kept constant.

When the drive circuit 27 turns off the switching device 21, the current is inhibited from flowing through the light output circuit 3, and the light emitting diodes 311 to 317 do not emit light.

With this operation, the rectangular wave voltage is applied from the light output control device 2 to the light source circuit 3 to allow the light source circuit 3 to emit light intermittently. Accordingly, the light source circuit 3 emits light with the light output level indicated by the light output control signal S3. Preferably, the frequency of the PWM signal S4 generated by the PWM signal generation circuit 26 is equal to or more than 500 Hz. When the PWM signal S4 has a frequency equal to or more than 500 Hz, a length of one cycle is 2 milliseconds or less, where one cycle includes a period in which the light emitting diodes 311 to 317 emit light and a period in which the light emitting diodes 311 to 317 do not emit light. That is, repetition cycle of the blinking of the light emitting diodes 311 to 317 is smaller than 2 milliseconds. In this case, the blinking of the light emitted from the light emitting diodes 311 to 317 cannot be recognized by the human, and the human feels that the light emitting diodes 311 to 317 emit light continuously.

When the PWM signal generation circuit 26 receives a light output control signal S3 indicating the setting value of 100% for light output level from the signal selection circuit 25, the PWM signal generation circuit 26 may output, to the drive circuit 27, a drive signal for keeping the switching device 21 turned on. According to the drive signal supplied from the PWM signal generation circuit 26, the drive circuit 27 keeps the switching device 21 turned on. In this case, the light output level of the light source circuit 3 is the maximum.

The switching device 21 serves as a switch for determining whether the DC voltage of the DC power supply 1 is supplied to the light source circuit 3. Therefore, the light output control device 2 of the present embodiment is smaller in a switching loss than the structure including a chopper circuit, and has an improved efficiency. The DC voltage of the DC power supply 1 has a voltage value (DC 24 V, for example) allowing the light source circuit 3 to emit light. Therefore, a smaller electronic component having a low withstand voltage can be used for a circuit component such as the switching device 21 of the light output control device 2 in the present embodiment, compared to a configuration including a boost chopper circuit for increasing a voltage and a step-down chopper circuit for decreasing the boosted voltage to generate a voltage and supplying the stepped-down voltage to the light source circuit 3. The light output control device 2 can be downsized accordingly.

(1.3) Structure of Light Output Control Device

Figure 6:
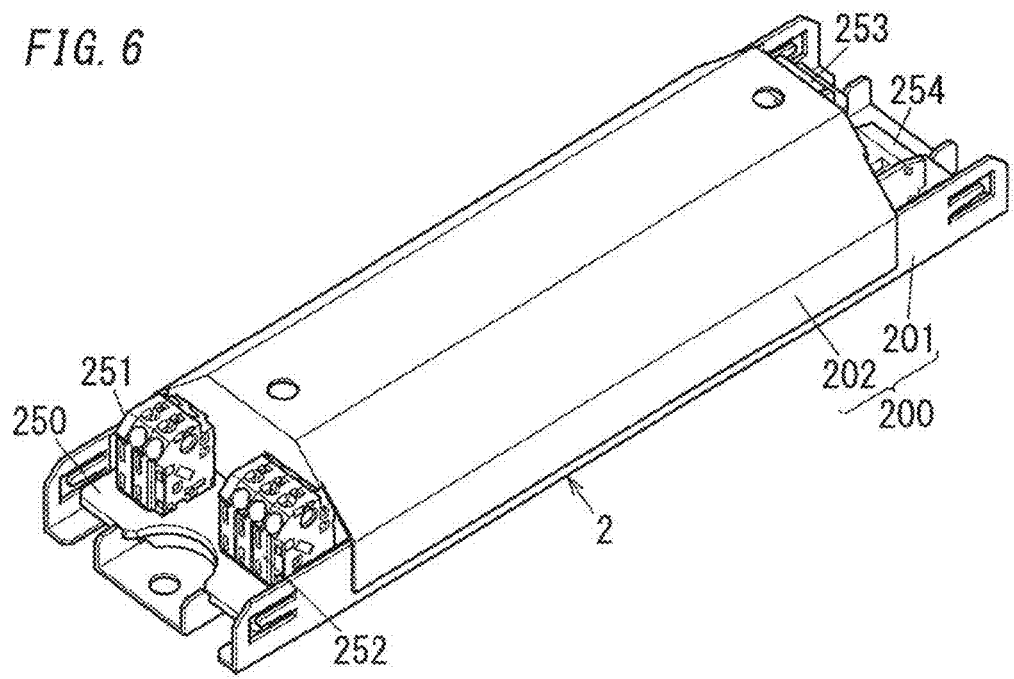
FIG. 6 is a perspective view of the light output control device.
Figure 7:
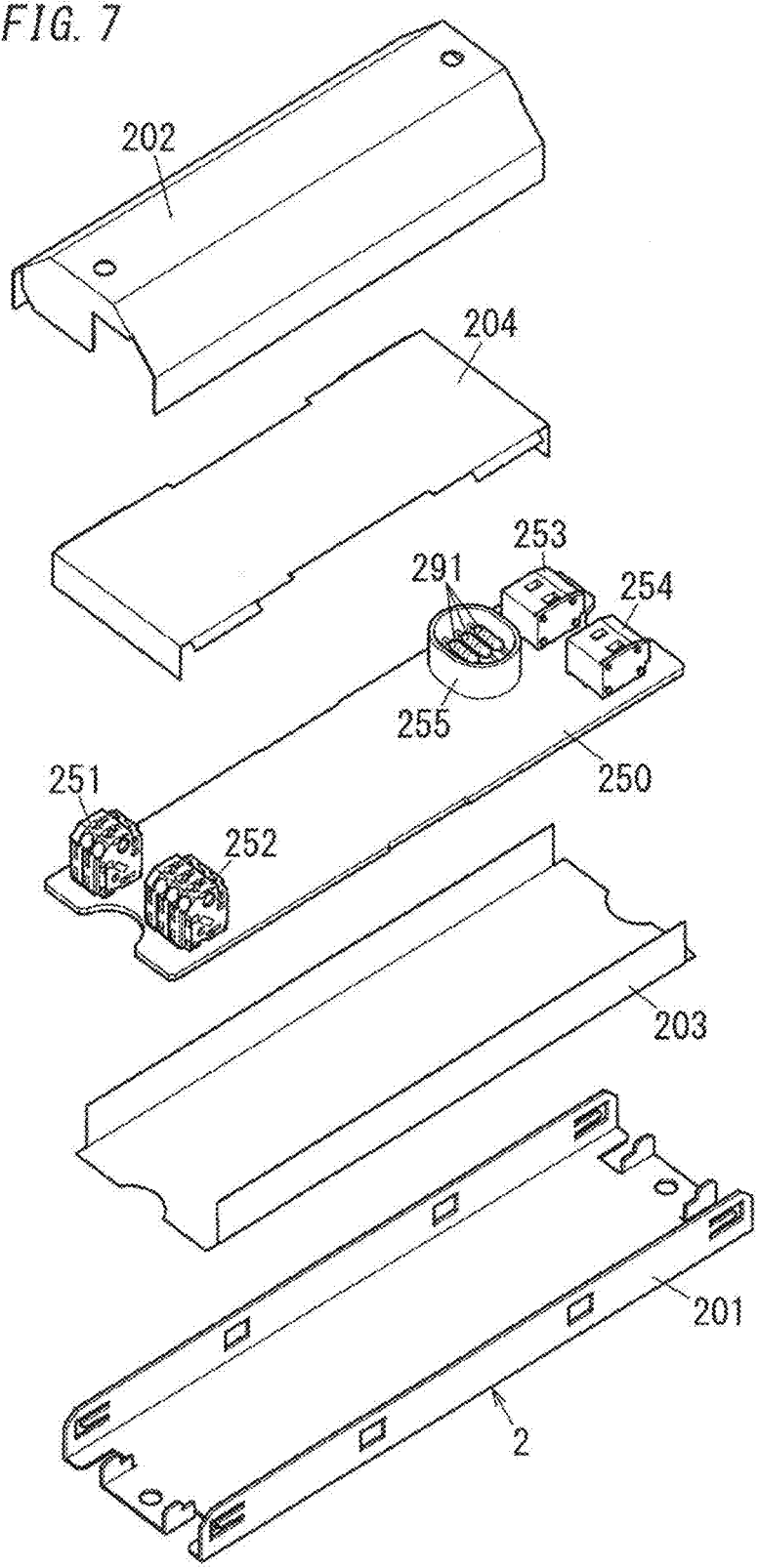
FIG. 7 is an exploded perspective view of the light output control device.
Figure 8:
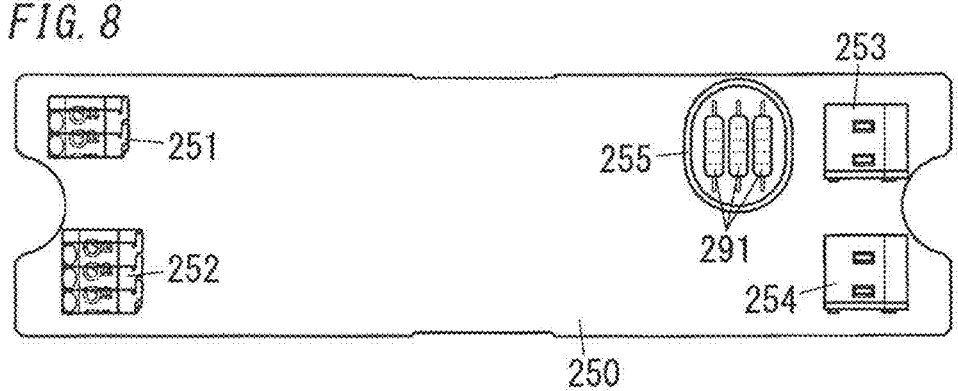
FIG. 8 is a plan view of a circuit board of the light output control device.

FIG. 6 is an external perspective view of the light output control device 2. FIG. 7 is an exploded perspective view of the light output control device 2. The light output control device 2 includes a case 200 made of metal. The case 200 includes a base plate 201 made of metal and a cover 202 made of metal. The base plate 201 has a U-shape when viewed in a longitudinal direction of the base plate 201. The cover 202 is attached to the base plate 201. A circuit board 250 is attached to the base plate 201. The circuit board 250 is provided with a circuit shown in FIG. 1. Terminal bases 251 and 252 are mounted on a first end in the longitudinal direction of the circuit board 250 and arranged side by side in a width direction of the circuit board 250 (see FIG. 7 and FIG. 8). The terminal base 251 has a structure of a rapid-connection terminal, and serves as the signal input port 230. The terminal base 252 has a structure of a rapid-connection terminal, and serves as the signal input port 240. Also, other terminal bases 253 and 254 are mounted on a second end in the longitudinal direction of the circuit board 250 and arranged side by side in the width direction of the circuit board 250. The terminal base 253 has a structure of a rapid-connection terminal, and serves as the power supply connection port 210. The terminal base 254 has a structure of a rapid-connection terminal, and serves as the light source connection port 220.

The cover 202 covers a center region in the longitudinal direction of the circuit board 250. The first and second ends, on which the terminal bases 251 and 252 and the terminal bases 253 and 254 are mounted respectively, of the circuit board 250 are not covered by the cover 202 and exposed outside the cover 202. The terminal base 251 serving as the signal input port 230 and the terminal base 252 serving as the signal input port 240 are separate bodies in the embodiment. However, the signal input port 230 and the signal input port 240 may be provided in one terminal base.

Three lead-type resistors 291 are mounted on the circuit board 250 and close to the terminal base 253 serving as the power supply connection port 210. The three resistors 291 constitute the resistor 29. The three resistors 291 are connected in parallel to each other. An insulation sleeve 255 formed into a cylinder tube shape is mounted on the circuit board 250 so as to surround the three resistors 291. An insulation sheet 203 is attached to an inner face of the base plate 201. The insulation sheet 203 is made of synthetic resin with an electric insulation property, and is formed into a sheet shape. Also, a protection cover 204 is attached to an upper side of the circuit board 250. The protection cover 204 is made of synthetic resin with an electric insulation property. The protection cover 204 protects circuit components mounted on the circuit board 250 except for the terminal bases 251 to 254.

In the light output control device 2 of the present embodiment, the power supply connection port 210 and the light source connection port 220 are not dedicated connectors, but are terminal bases having a structure of rapid-connection terminal. Therefore, there is a concern that a power supply wire connected to an AC power supply 100 may be accidentally connected to the power supply connection port 210 and/or the light source connection port 220. In this regard, in the present embodiment, the resistor 29 is connected between the power supply connection port 210 and the light source connection port 220. Therefore, when the power supply wire connected to the AC power supply 100 is accidentally connected to the power supply connection port 210 or the light source connection port 220, the resistor(s) 291 will be fused and thus the circuit will be broken. As a result, other circuit components can be protected.

The resistor 291 having lead terminals is longer in an inter-terminal distance than a chip-mount type resistor. Therefore, when the resistor 291 is fused, arc discharge is not likely to occur between terminals electrically connected to opposite ends of the resistor 291. It is thus possible to ensure protection of the circuit. The inter-terminal distance of the resistor 291 is defined as a distance between respective positions where opposite lead terminals of the resistor 291 are fixed to the circuit board 250. Preferably, the inter-terminal distance is 5 mm or more.

The insulation sleeve 255 is provided on the circuit board 250 so as to surround the resistors 291. Accordingly, fused parts of the resistors 291 can be prevented from scattering outside the insulation sleeve 255. The light output control device 2 of the present embodiment includes the lead-type resistor 291 instead of a fuse. The lead-type resistor 291 is smaller in size and lower in cost than the fuse. Therefore, downsizing and cost reduction of the light output control device 2 can be achieved. The resistor 29 is electrically connected between the connection terminal 211 of the power supply connection port 210 and the connection terminal 221 of the light source connection port 220, but is not limited thereto. For example, the resistor 29 may be electrically connected between the connection terminal 212 and the connection terminal 222.

(1.4) Overview

As described above, the light output control device 2 of the present embodiment includes the switching device 21, the multiple signal input ports (e.g., the two signal input ports 230 and 240 in the present embodiment), the signal selection circuit 25, and the control circuit 24. The switching device 21 is electrically connected between the DC power supply 1 and the light source circuit 3 including the semiconductor light emitting element (e.g., the light emitting diodes 311 to 317 in the present embodiment). The multiple signal input ports respectively correspond to multiple kinds of light output control signals. The signal selection circuit 25 selects any of two or more light output control signals inputted through the multiple signal input ports. The control circuit 24 performs switching control of the switching device 21 with a duty cycle corresponding to the light output level indicated by the light output control signal selected by the signal selection circuit 25. Each of the light output control signals is a signal indicating a maximum desired light output level for the light source circuit 3 when the magnitude of the light output control signal is minimum. The signal selection circuit 25 selects, from the two or more light output control signals, a light output control signal indicating a lowest light output level.

With this configuration, when two or more light output control signals are inputted to the signal selection circuit 25, the signal selection circuit 25 selects a light output control signal indicating a lowest light output level from the two or more light output control signals. The control circuit 24 controls the light output of the light source circuit 3 in accordance with the light output control signal selected by the signal selection circuit 25. Therefore, the light output control device 2 can adequately handle the multiple kinds of light output control signals. In the present embodiment, the light output control device 2 includes the two signal input ports and the two kinds of light output control signals are inputted to the signal selection circuit 25, but embodiments are not limited thereto. The light output control device 2 may include three or more signal input ports, and the signal selection circuit 25 may receive three or more kinds of light output control signals through the signal input ports. The light output control signal S2 may be a voltage signal of which voltage level is any of three or more levels. For example, the relay circuit 5 may include two or more relays and output a voltage signal having any of three or more voltage levels determined in accordance with a combination of on and off of the two or more relays. Accordingly, the second conversion circuit 50 may be configured to convert a voltage signal of which voltage level is any of three or more levels serving as the light output control signal S2 into the conversion value having a voltage value corresponding to the voltage level of the received voltage signal. Examples of the multiple kinds of light output control signals are not limited to the PWM signal and the voltage signal of which voltage level is any of two or more levels exemplified in the present embodiment, as long as the light control output signal is represented by a physical amount (such as a voltage value and a current value, for example) having a variable magnitude that varies with a desired light output level. The first conversion circuit 40 and the second conversion circuit 50 each convert the light output control signal into a voltage value corresponding to the light output level indicated by the light output control signal in the present embodiment, but may convert it into a physical amount (current value, for example) other than the voltage value in another example.

The signal input port may be a component (a connector, for example) for being connected to an electric wire, or may be lead wires of an electronic component or parts of electric conductors formed on the circuit board as wiring, for example.

The illumination system of the present embodiment includes the light output control device 2, the light source circuit 3 including the semiconductor light emitting element (the light emitting diodes 311 to 317 in the present embodiment).

With this configuration, it is possible to provide the illumination system capable of adequately handling multiple kinds of light output control signals.

Embodiment 2

A light output control device and an illumination system according to Embodiment 2 will be explained with reference to FIG. 9 to FIG. 11.

A light output control device 2 and an illumination system according to the present embodiment have structures similar to those of the light output control device 2 and the illumination system according to Embodiment 1, except for a signal selection circuit 25. Therefore, components common to the present embodiment and those of Embodiment 1 are designated by common reference signs and explanations thereof are omitted.

Figure 9:
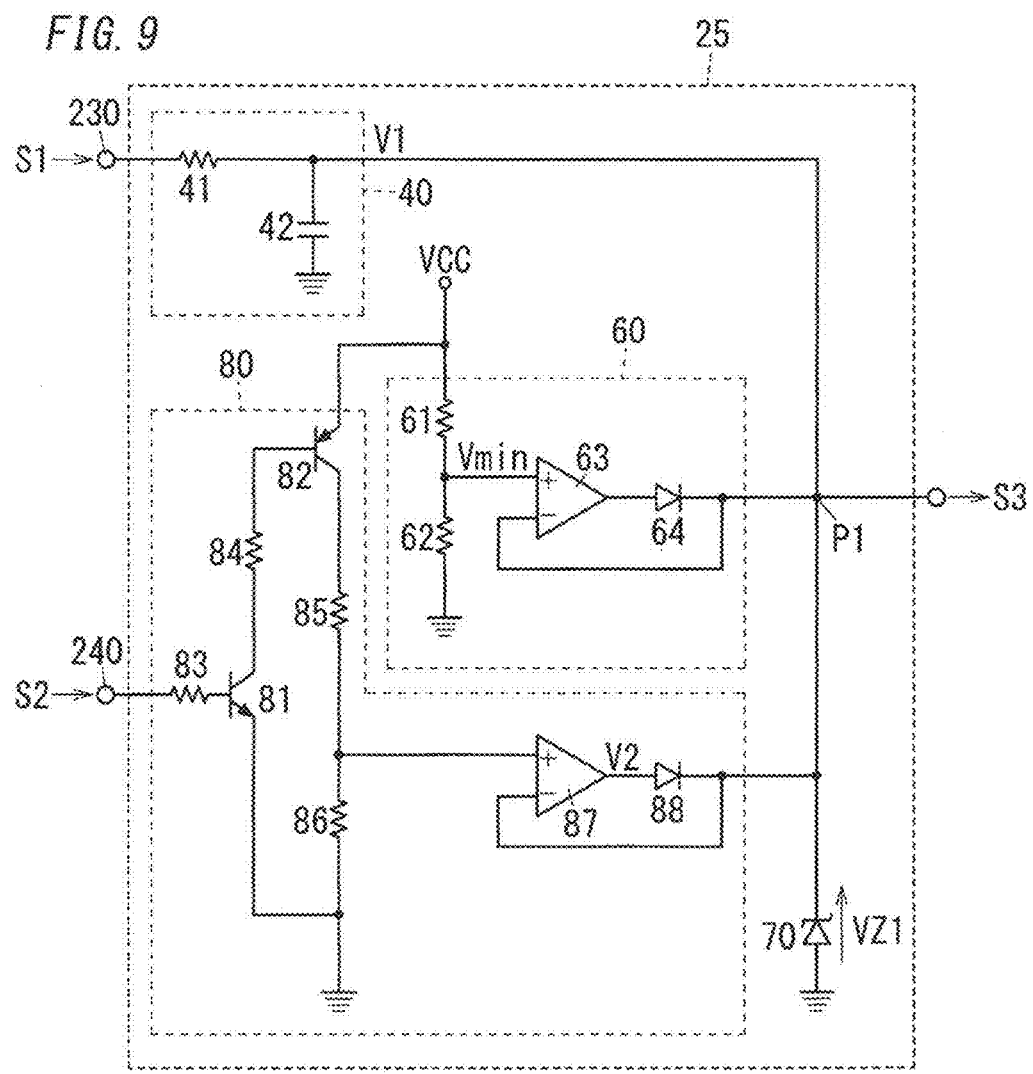
FIG. 9 is a circuit diagram of a signal selection circuit in a light output control device according to Embodiment 2 of the present disclosure.

As shown in FIG. 9, the signal selection circuit 25 includes a first conversion circuit 40, a second conversion circuit 80, a lower limit setting circuit 60, and a zener diode 70 for setting an upper limit. The first conversion circuit 40, the lower limit setting circuit 60, and the zener diode 70 have similar structures to those of Embodiment 1, and explanations thereof are omitted. The circuit structure of the signal selection circuit 25 shown in FIG. 9 is an example, and the signal selection circuit 25 is not limited to having the circuit structure shown in FIG. 9.

For example, a dimmer 4 is connected to a signal input port 230 of the signal selection circuit 25, and a relay circuit 5 is connected to a signal input port 240. A PWM signal (light output control signal S1) having a duty cycle corresponding to a desired light output level is supplied from the dimmer 4 to the signal input port 230. A voltage signal (light output control signal S2) is supplied to the signal input port 240. The light output control signal S2 is a voltage signal with a voltage level indicative of either of two levels in accordance with whether a relay of the relay circuit 5 is on or off, for example. According to the light output control signal S1 of the present embodiment, the light output control signal S1 indicates the maximum desired light output level for the light source circuit 3 when the duty cycle (magnitude) of the light output control signal S1 is maximum. According to the light output control signal S2 of the present embodiment, the light output control signal S2 indicates the maximum desired light output level for the light source circuit 3 when the voltage level (magnitude) of the light output control signal S2 is maximum.

Figure 10A:
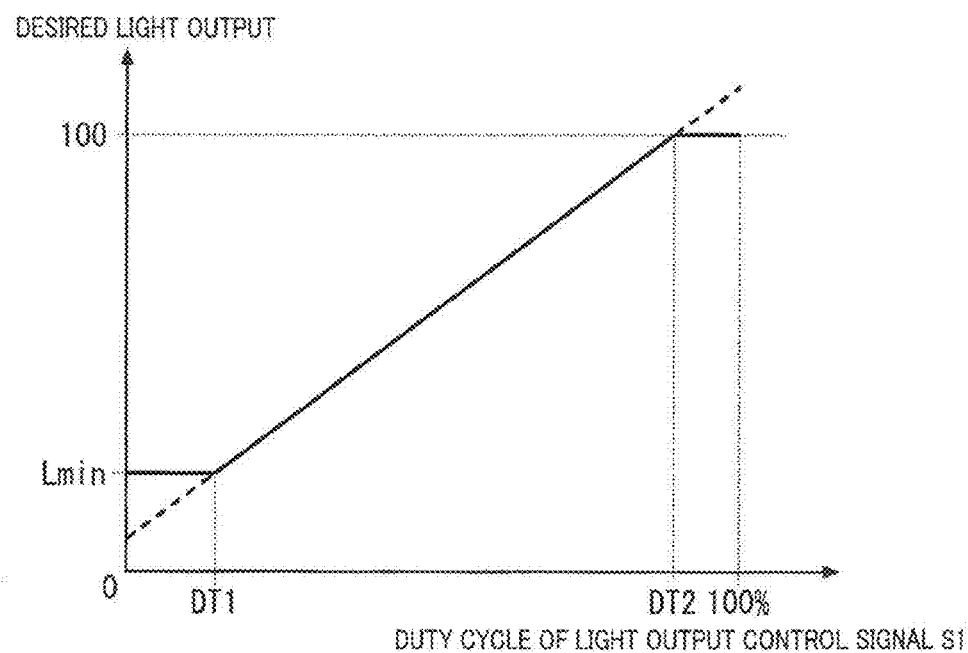
FIG. 10A is a graph illustrating a relation between a desired light output and a duty cycle according to a light output control signal S1 of the light output control device of Embodiment 2.

In the embodiment, the light output control signal S1 is a PWM signal having a duty cycle corresponding to a setting value for light output level of the light source circuit 3. The light output control signal S1 is defined to indicate the maximum of the setting value for light output level when the duty cycle is maximum. FIG. 10A is a graph illustrating a relation between the setting value for light output level (desired light output) and the duty cycle of the light output control signal S1. The setting value for light output level increases in direct proportion to the duty cycle of the light output control signal S1. Therefore, the setting value for light output level increases and also the light output of the light source circuit 3 increases with an increase in the duty cycle of the light output control signal S1. In the example of FIG. 10A, the setting value for light output level changes linearly with respect to the duty cycle of the light output control signal S1, but the light output controls signal S1 is not limited to this. The setting value for light output level may change nonlinearly with respect to the duty cycle of the light output control signal S1, as long as the setting value for light output level increases with an increase in the duty cycle.

The second conversion circuit 80 includes an NPN transistor 81, a PNP transistor 82, resistors 83 to 86, an operation amplifier 87, and a diode 88. The operation amplifier 87 has a non-inverting input terminal connected to a connection point of the resistors 85 and 86 that constitute a voltage divider circuit. The voltage divider circuit of the resistors 85 and 86 has a high voltage side terminal connected to a collector of the transistor 82. A constant DC voltage Vcc is supplied from a power supply circuit 28 to an emitter of the transistor 82. The voltage divider circuit of the resistors 85 and 86 has a low voltage side terminal connected to a ground of the signal selection circuit 25. The transistor 82 has a base connected to a collector of the transistor 81 through the resistor 84. The transistor 81 has an emitter connected to the ground of the signal selection circuit 25. The transistor 81 has a base connected to the signal input port 240 through the resistor 83. The operation amplifier 87 has an output terminal connected to an anode of the diode 88. The operation amplifier 87 has an inverting input terminal connected to a cathode of the diode 88. The cathode of the diode 88 is also connected to an output end P1 of the signal selection circuit 25. The diode 88 is connected between the output terminal of the operation amplifier 87 and the output end P1 so as to allow a current to flow in a direction from the output terminal of the operation amplifier 87 to the output end P1. Therefore, when a voltage value of the output voltage V1 of the first conversion circuit 40 is equal to or less than a voltage value of an output voltage V2 of the operation amplifier 87, the second conversion circuit 80 holds (clamps) the voltage value of the output end P1 to the voltage value of the output voltage V2 of the operation amplifier 87.

Figure 10B:
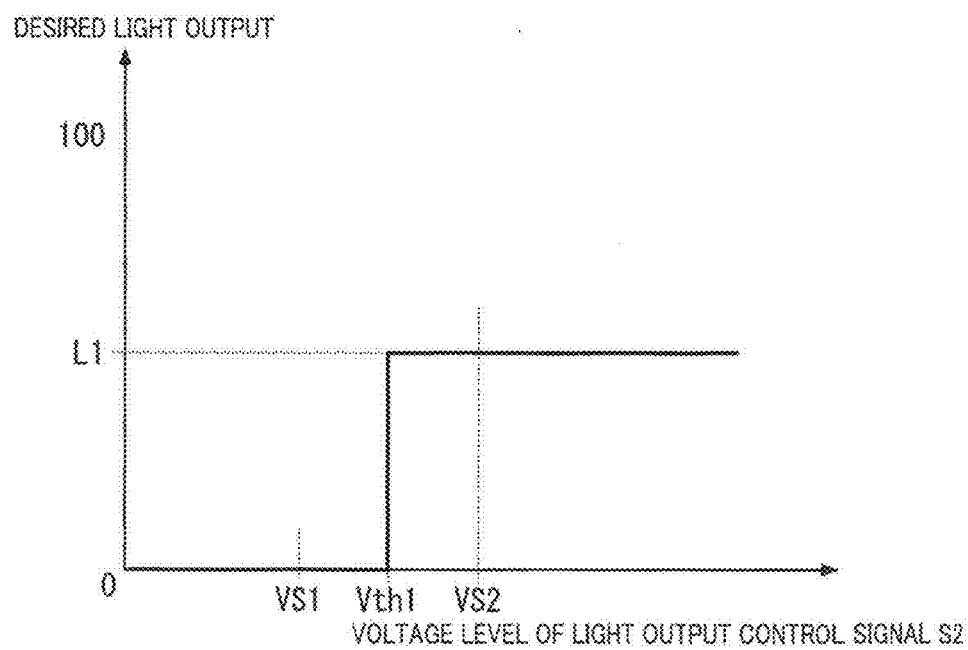
FIG. 10B is a graph illustrating a relation between a desired light output and a voltage level according to a light output control signal S2 of the light output control device of Embodiment 2.

In the present embodiment, the light output control signal S2 supplied to the signal input port 240 is a voltage signal with a voltage level indicative of either of two levels in accordance with whether the relay of the relay circuit 5 is on or off. The light output control signal S2 is defined to indicate the maximum of the setting value for light output level for the light source circuit 3 when the voltage level is maximum. FIG. 10B is a graph illustrating a relation between the light output level and the voltage level of the light output control signal S2. The light output control signal S2 with the voltage level less than threshold Vth1 indicates the setting value of 0% for light output level. The light output control signal S2 with the voltage level equal to or higher than the threshold Vth1 indicates the setting value of L1% for light output level.

In the present embodiment, when the relay is turned on, the light output control signal S2 has a voltage level of VS1

(<Vth1), and the output voltage V2 of the operation amplifier 87 of the second conversion circuit 80 thus has a voltage value indicating the setting value of 0% for light output level.

When the relay is turned off, the light output control signal S2 has a voltage level of VS2 (>Vth1), and the output voltage V2 of the operation amplifier 87 of the second conversion circuit 80 thus has a voltage value indicating the setting value of L1% for light output level. In the example of FIG. 10B, the setting value for light output level is switched between 0% and L1% depending on whether the voltage level of the light output control signal S2 is lower or higher than the threshold Vth1.

Note that, there may be a hysteresis width between the threshold for the light output control signal S2 for determining whether to change the setting value for light output level from L1% to 0% and the threshold for the light output control signal S2 for determining whether to change the setting value for light output level from 0% to L1%.

Hereinafter, operations of the illumination system will be described. Operations of the control circuit 24 in the present embodiment are similar to those of Embodiment 1, and thus operations of the signal selection circuit 25 of Embodiment 2 different from that of Embodiment 1 are explained hereinafter.

The following explanation referring to FIG. 11A and FIG. 11B relates to an operation of the signal selection circuit 25 with the signal input port 230 and the signal input port 240 respectively receiving the light output control signal S1 from the dimmer 4 and the light output control signal S2 from the relay circuit 5.

In a period from a time point t10 to a time point t12, the relay is turned on, and the light output control signal S2 has the first level VS1. In this period, the light output level indicated by the light output control signal S2 is 0%. In a period after the time point t12, the relay is turned off, and the light output control signal S2 has the second level VS2. In this period, the light output level indicated by the light output control signal S2 is L1%.

At the time point t10, the duty cycle of the light output control signal S1 is set to 100%. The duty cycle of the light output control signal S1 gradually decreases over time in a period between the time point t10 and a time point t13. The duty cycle of the light output control signal S1 reaches 0% at the time point t13. Therefore, the light output level indicated by the light output control signal S1 is 100% at the time point t10, and decreases from 100% to Lmin % with a lapse of time from the time point t11 to the time point t13.

In the period from the time point t10 to the time point t12, the light output level indicated by the light output control signal S1 is higher than the light output level indicated by the light output control signal S2. In this case, the voltage value of the output voltage V1 of the first conversion circuit 40 is greater than the voltage value of the output voltage V2 of the second conversion circuit 80, and as a result the voltage value of the output end P1 of the signal selection circuit 25 is set to the voltage value of the output voltage V1 of the first conversion circuit 40. That is, the signal selection circuit 25 selects the light output control signal S1, which indicates a higher light output level of the light output control signals S1 and S2, and generates a light output control signal S3 in accordance with the light output control signal S1, and outputs the light output control signal S3 to the PWM signal generation circuit 26. In a period from the time point t10 to a time point t11, the voltage value of the output voltage V1 of the first conversion circuit 40 is greater than the zener voltage VZ1 of the zener diode 70, and thus the light output control signal S3 is set to a voltage value corresponding to the upper limit (100%) of the light output level. In a period from the time point t11 to the time point t12, the voltage value of the output voltage V1 of the first conversion circuit 40 is smaller than the zener voltage VZ1, and thus the light output control signal S3 is set to a voltage value corresponding to the output voltage V1 of the first conversion circuit 40.

The relay is turned off at the time point t12. In the period after the time point t12, the light output level indicated by the light output control signal S1 is lower than the light output level indicated by the light output control signal S2. In this case, the voltage value of the output voltage V2 of the second conversion circuit 80 is greater than the voltage value of the output voltage V1 of the first conversion circuit 40, and as a result the voltage value of the output end P1 of the signal selection circuit 25 is set to the voltage value of the output voltage V2 of the second conversion circuit 80. The signal selection circuit 25 outputs the light output control signal S3 of which voltage value corresponds to the light output control signal S2.

In summary, when the two light output control signals S1 and S2 are inputted to the signal selection circuit 25, the signal selection circuit 25 selects a light output control signal indicating a higher light output level from the two light output control signals S1 and S2.

In the explanation above, the two light output control signals S1 and S2 are both inputted to the signal selection circuit 25, but either one of the light output control signals S1 and S2 alone may be inputted to the signal selection circuit 25.

For example, the following explanation relates to an operation of the signal selection circuit 25 in a case where the light output control signal S1 is supplied to the signal input port 230 but the light output control signals S2 is not supplied to the signal input port 240. When the light output control signal S2 is not supplied to the signal input port 240, the voltage level of the signal input port 240 is lower than the threshold Vth1. Therefore, the output voltage V2 of the operation amplifier 87 of the second conversion circuit 80 has a voltage value indicating the setting value of 0% for light output level. In this case, the signal selection circuit 25 selects the output voltage V1, which indicates a higher light output level, from the output voltages V1 and V2, and the signal selection circuit 25 outputs the light output control signal S3 having a voltage value corresponding to the light output control signal S1.

The following explanation relates to an operation of the signal selection circuit 25 in another case where the light output control signal S2 is supplied to the signal input port 240 but the light output control signals S1 is not supplied to the signal input port 230. It is considered that a situation where the light output control signal S1 is not supplied to the signal input port 230 is equivalent to a situation where the light output control signal S1 having a duty cycle of 0% is supplied. Therefore, the output voltage V1 of the first conversion circuit 40 has a voltage value indicating a minimum light output level. In the embodiment, due to the presence of the lower limit setting circuit 60, the output voltage V1 is set to a voltage value corresponding to the lower limit Lmin. In this case, the signal selection circuit 25 selects the output voltage V2, which indicates a higher light output level, from the output voltages V1 and V2, and the signal selection circuit 25 outputs the light output control signal S3 having a voltage value corresponding to the light output control signal S2.

As described above, the light output control device 2 of the present embodiment includes the switching device 21, the multiple signal input ports (the two signal input ports 230 and 240 in the present embodiment), the signal selection circuit 25, and the control circuit 24. The switching device 21 is electrically connected between the DC power supply 1 and the light source circuit 3 including the semiconductor light emitting element (the light emitting diodes 311 to 317 in the present embodiment). The multiple signal input ports respectively correspond to multiple kinds of light output controls signals. The signal selection circuit 25 selects any of two or more light output control signals inputted through the multiple signal input ports. The control circuit 24 performs switching control of the switching device 21 with a duty cycle corresponding to the light output level indicated by the light output control signal selected by the signal selection circuit 25. Each of the light output control signals is a signal indicating a maximum desired light output level for the light source circuit 3 when the magnitude of the light output control signal is maximum. The signal selection circuit 25 selects, from the two or more light output control signals, a light output control signal indicating a highest light output level.

With this configuration, when two or more light output control signals are inputted to the signal selection circuit 25, the signal selection circuit 25 selects a light output control signal indicating a highest light output level from the two or more light output control signals. The control circuit 24 controls the light output of the light source circuit 3 in accordance with the light output control signal selected by the signal selection circuit 25. Therefore, the light output control device 2 can adequately handle the multiple kinds of light output control signals. In the present embodiment, the light output control device 2 includes the two signal input ports and the two kinds of light output control signals are inputted to the signal selection circuit 25, but embodiments are not limited thereto. The light output control device 2 may include three or more signal input ports, and the signal selection circuit 25 may receive three or more kinds of light output control signals through the signal input ports. The light output control signal S2 may be a voltage signal of which voltage level is any of three or more levels. Accordingly, the second conversion circuit 50 may be configured to convert a voltage signal of which voltage level is any of three or more levels serving as the light output control signal S2 into the conversion value having a voltage value corresponding to the voltage level of the received voltage signal. Examples of the multiple kinds of light output control signals are not limited to the PWM signal and the voltage signal of which voltage level is any of two or more levels, as long as it is represented by a physical amount (such as a voltage value and a current value, for example) having a variable magnitude that varies with a desired light output level. The first conversion circuit 40 and the second conversion circuit 80 each convert the light output control signal into a voltage value corresponding to the light output level indicated by the light output control signal in the present embodiment, but may convert it into a physical amount (current value, for example) other than the voltage value in another example.

As described above, in the light output control device 2 of Embodiments 1 and 2, the control circuit 24 performs the switching control of the switching device 21 to convert the DC voltage supplied from the DC power supply 1 into the rectangular wave voltage, and the resultant rectangular wave voltage is supplied to the light source circuit 3. The amplitude of the resultant rectangular wave voltage equals to the voltage value of the DC voltage supplied from the DC power supply 1.

The DC voltage supplied from the DC power supply 1 is converted into the rectangular wave voltage having amplitude equal to a voltage value of the DC voltage by the switching operation of the switching device 21 performed by the control circuit 24, and the resultant rectangular wave voltage is applied to the light source circuit 3. That is, the switching device 21 serves as a switch for determining whether the DC voltage of the DC power supply 1 is supplied to the light source circuit 3. Therefore, the light output control device 2 of the present embodiment is smaller in a switching loss than the structure including a chopper circuit, and has an improved efficiency.

The light output control device 2 of Embodiments 1 and 2 may further include the circuit board 250. The switching device 21, the multiple signal input ports (the two signal input ports 230 and 240 in the embodiments), the signal selection circuit 25, and the control circuit 24 are mounted on the circuit board 250. Each of the multiple signal input ports may be disposed at an end of the circuit board 250.

In this case, since each of the multiple signal input terminals are disposed at an end of the circuit board 250, it is easy to connect electric wires thereto, compared to a case where the multiple signal input ports are provided at a center of the circuit board 250.

In the light output control device 2 of Embodiment 1 and 2, preferably, at least one of the multiple kinds of light output control signals is a signal having a variable magnitude that varies continuously with a desired light output level of the light source circuit 3. In this case, it is possible to continuously adjust the light output level of the light source circuit 3 by the light output control device 2.

Embodiment 3

The light output control device 2 and the light source circuit 3 described in Embodiment 1 and 2 may be used in an illumination device for space illumination, a facility apparatus provided with a light source circuit for illumination, and the like. Examples of the facility apparatus include a refrigeration showcase provided with a light source circuit for illuminating commercial articles, a vending machine provided with a light source circuit for illuminating articles or samples, and the like.

A facility apparatus of the present embodiment is explained with reference to FIG. 12A.

The facility apparatus of the present embodiment is a refrigeration showcase 90A. The refrigeration showcase 90A may be installed in a retail store such as a convenience store. The refrigeration showcase 90A is used for displaying articles for sale while cooling or heating the articles. The refrigeration showcase 90A includes a main body 91 that includes a display room 92 having an open front face. Multiple (three, in the illustrated example) display shelves 93 for displaying the articles are provided in the display chamber 92. The light source circuit 3 is provided in the main body 91 at a ceiling part of the display room 92. A DC power supply 1 and the light output control device 2 are installed inside the main body 91. The light output of the light source circuit 3 is controlled by the light output control device 2. The articles displayed on the display shelves 93 are illuminated with the light emitted from the light source circuit 3.

A facility apparatus of a modification of the present embodiment is explained with reference to FIG. 12B.

The facility apparatus of the modification is a vending machine 90B. The vending machine 90B has a main body 94 including an inside space forming a display room 95 for displaying samples 96. A transparent window 97 is provided in a front face of the main body 94, which allows a customer to see the inside of the display room 95 through the window 97. The light source circuit 3 is provided in the main body 94 at an upper part of the display room 95. A DC power supply 1 and the light output control device 2 are installed inside the main body 94. The light output of the light source circuit 3 is controlled by the light output control device 2. The samples 96 displayed in the display room 95 are illuminated with the light emitted from the light source circuit 3.

As described above, the facility apparatus (the refrigeration showcase 90A the vending machine 90B) of the present embodiment includes the light source circuit 3, the light output control device 2, and a facility apparatus body (main body 91, 94). The light source circuit 3 includes a semiconductor light emitting element (light emitting diodes 311 to 317, in the present embodiment). The light output control device controls the light output of the light source circuit 3. The facility apparatus body holds the light source circuit 3 and the light output control device 2.

With this configuration, it is possible to provide the facility apparatus capable of adequately handling multiple kinds of light output control signals.

(Aspects)

As apparent from the embodiments described above, a light output control device (2) according to the first aspect includes a switching device (21), multiple signal input ports (230, 240), a signal selection circuit (25), and a control circuit (24). The switching device (21) is to be electrically connected between a direct-current power supply (1) and a light source circuit (3). The light source circuit (3) includes a semiconductor light emitting element (311 to 317). The multiple signal input ports (230 and 240) respectively correspond to multiple kinds of light output control signals (S1, S2). The signal selection circuit (25) is configured to, when receiving two or more light output control signals (S1, S2) indicating different light output levels through the multiple signal input ports (230, 240), select a light output control signal indicating a lowest light output level, from the two or more light output control signals (S1, S2). The control circuit (24) is configured to perform switching control of the switching device (21) with a duty cycle corresponding to the lowest light output level indicated by the light output control signal selected by the signal selecting circuit (25).

The light output control device (2) according to the second aspect would be realized in combination with the first aspect. In the second aspect, the signal selection circuit (25) includes multiple conversion circuits (40, 50) respectively corresponding to the multiple signal input ports (230, 240). Each of the multiple conversion circuits (40, 50) is configured to receive a light output control signal of the multiple kinds of light output control signals (S1, S2) through a corresponding one of the multiple signal input ports (230, 240), and convert the received light output control signal into a conversion value which is represented by a physical amount and has a magnitude corresponding to a light output level indicated by the received light output control signal. The signal selection circuit (25) is configured to select, from the two or more light output control signals (S1, S2), a light output control signal corresponding to the conversion value indicating the lowest light output level.

The light output control device (2) according to the third aspect includes a switching device (21), multiple signal input ports (230, 240), a signal selection circuit (25), and a control circuit (24). The switching device (21) is to be electrically connected between a direct-current power supply (1) and a light source circuit (3). The light source circuit (3) includes a semiconductor light emitting element (311 to 317). The multiple signal input ports (230, 240) respectively correspond to multiple kinds of light output control signals (S1, S2). The signal selection circuit (25) is configured to, when receiving two or more light output control signals (S1, S2) indicating different light output levels through the multiple signal input ports, select a light output control signal indicating a highest light output level, from the two or more light output control signals (S1, S2). The control circuit (24) is configured to perform switching control of the switching device (21) with a duty cycle corresponding to the highest light output level indicated by the light output control signal selected by the signal selecting circuit (25).

The light output control device (2) according to the fourth aspect would be realized in combination with the third aspect. In the fourth aspect, the signal selection circuit (25) includes multiple conversion circuits (40, 80) respectively corresponding to the multiple signal input ports (230, 240). Each of the multiple conversion circuits (40, 80) is configured to receive a light output control signal of the multiple kinds of light output control signals (S1, S2) through a corresponding one of the multiple signal input ports (230, 240), and convert the received light output control signal into a conversion value which is represented by a physical amount and has a magnitude corresponding to a light output level indicated by the received light output control signal. The signal selection circuit (25) is configured to select, from the two or more light output control signals (S1, S2), a light output control signal corresponding to the conversion value indicating the highest light output level.

The light output control device (2) according to the fifth aspect would be realized in combination with the second or fourth aspect. In the fifth aspect, the multiple conversion circuits (40, 50; 40, 80) includes the first conversion circuit (40) and the second conversion circuit (50; 80). The first conversion circuit (40) is configured to convert a pulse width modulation signal serving as one (S1) of the multiple kinds of light output control signals (S1, S2) into the conversion value which is represented by a DC voltage and has a voltage value corresponding to a duty cycle of the received pulse width modulation signal. The second conversion circuit (50; 80) is configured to convert a voltage signal of which voltage level is any of two or more levels serving as one (S2) of the multiple kinds of light output control signals (S1, S2) into the conversion value having a voltage value corresponding to the voltage level of the received voltage signal.

The light output control device (2) according to the sixth aspect would be realized in combination with any one of the first to fifth aspects. In the sixth aspect, the control circuit (24) is configured to perform the switching control of the switching device (21) to convert a DC voltage outputted from the DC power supply (1) into a rectangular wave voltage to supply the rectangular wave voltage to the light source circuit (3). The rectangular wave voltage has an amplitude equal to a voltage value of the DC voltage outputted from the DC power supply (1).

The light output control device (2) according to the seventh aspect would be realized in combination with any one of the first to sixth aspects, and further includes a circuit board (250). The switching device (21), the multiple signal input ports (230, 240), the signal selection circuit (25), and the control circuit (24) are mounted on the circuit board (250). Each of the multiple signal input ports (230, 240) is arranged on an end of the circuit board (250).

The light output control device (2) according to the eighth aspect would be realized in combination with any one of the first to seventh aspects. In the eighth aspect, at least one of the multiple kinds of light output control signals (S1, S2) is a signal having a variable magnitude that varies continuously with a desired light output level of the light source circuit (3).

The illumination system according to the ninth aspect includes the light output control device (2) according to any one of the first to eighth aspects, and the light source circuit (3) including the semiconductor light emitting element (311 to 317).

The facility apparatus (90A, 90B) according to the tenth aspect includes the light output control device (2) according to any one of the first to eighth aspects, the light source circuit (3), and a facility apparatus body (91; 94). The light source circuit (3) includes the semiconductor light emitting element (311 to 317). The facility apparatus body (91; 94) holds the light source circuit (3) and the light output control device (2).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A light output control device, comprising:
a switching device to be electrically connected between a direct-current power supply and a light source circuit including a semiconductor light emitting element;
multiple signal input ports respectively corresponding to multiple kinds of light output control signals;
a signal selection circuit configured to, when receiving two or more light output control signals indicating different light output levels through the multiple signal input ports, select a light output control signal indicating a lowest light output level, from the two or more light output control signals; and
a control circuit configured to perform switching control of the switching device with a duty cycle corresponding to not all of the different light output levels indicated by the two or more light output control signals but the lowest light output level indicated by the light output control signal selected by the signal selecting circuit.

2. The light output control device of claim 1, wherein:
the signal selection circuit includes multiple conversion circuits respectively corresponding to the multiple signal input ports,
each of the multiple conversion circuits is configured to
receive a light output control signal of the multiple kinds of light output control signals through a corresponding one of the multiple signal input ports, and
convert the received light output control signal into a conversion value which is represented by a physical amount and has a magnitude corresponding to a light output level indicated by the received light output control signal, and
the signal selection circuit is configured to select, from the two or more light output control signals, a light output control signal corresponding to the conversion value indicating the lowest light output level.

3. The light output control device of claim 2, wherein:
the multiple conversion circuits include
a first conversion circuit configured to convert a pulse width modulation signal serving as one of the multiple kinds of light output control signals into the conversion value which is represented by a DC voltage and has a voltage value corresponding to a duty cycle of the received pulse width modulation signal, and
a second conversion circuit configured to convert a voltage signal of which voltage level is any of two or more levels serving as one of the multiple kinds of light output control signals into the conversion value having a voltage value corresponding to the voltage level of the received voltage signal.

4. The light output control device of claim 1, wherein the control circuit is configured to perform the switching control of the switching device to convert a DC voltage outputted from the DC power supply into a rectangular wave voltage to supply the rectangular wave voltage to the light source circuit, the rectangular wave voltage having an amplitude equal to a voltage value of the DC voltage outputted from the DC power supply.

5. The light output control device of claim 1, wherein the switching device, the multiple signal input ports, the signal selection circuit, and the control circuit are mounted on a circuit board, and
each of the multiple signal input ports is arranged on an end of the circuit board.

6. The light output control device of claim 1, wherein at least one of the multiple kinds of light output control signals is a signal having a variable magnitude that varies continuously with a desired light output level of the light source circuit.

7. An illumination system, comprising:
the light output control device of claim 1; and
the light source circuit including the semiconductor light emitting element.

8. A facility apparatus, comprising:
the light output control device of claim 1;
the light source circuit including the semiconductor light emitting element; and
a facility apparatus body that holds the light source circuit and the light output control device.

9. A light output control device, comprising:
a switching device to be electrically connected between a direct-current power supply and a light source circuit including a semiconductor light emitting element;
multiple signal input ports respectively corresponding to multiple kinds of light output control signals;
a signal selection circuit configured to, when receiving two or more light output control signals indicating different light output levels through the multiple signal input ports, select a light output control signal indicating a highest light output level, from the two or more light output control signals; and
a control circuit configured to perform switching control of the switching device with a duty cycle corresponding to not all of the different light output levels indicated by the two or more light output control signals but the highest light output level indicated by the light output control signal selected by the signal selecting circuit.

10. The light output control device of claim 9, wherein
the signal selection circuit includes multiple conversion circuits respectively corresponding to the multiple signal input ports, each of the multiple conversion circuits is configured to
receive a light output control signal of the multiple kinds of light output control signals through a corresponding one of the multiple signal input ports, and
convert the received light output control signal into a conversion value which is represented by a physical amount and has a magnitude corresponding to a light output level indicated by the received light output control signal, and the signal selection circuit is configured to select, from the two or more light output control signals, a light output control signal corresponding to the conversion value indicating the highest light output level.

11. The light output control device of claim 10, wherein:
the multiple conversion circuits include
a first conversion circuit configured to convert a pulse width modulation signal serving as one of the multiple kinds of light output control signals into the conversion value which is represented by a DC voltage and has a voltage value corresponding to a duty cycle of the received pulse width modulation signal, and
a second conversion circuit configured to receive a voltage signal of which voltage level is any of two or more levels as one of the multiple light output control signals into the conversion value having a voltage value corresponding to the voltage level of the received voltage signal.

12. The light output control device of claim 9, wherein
the control circuit is configured to perform the switching control of the switching device to convert a DC voltage outputted from the DC power supply into a rectangular wave voltage to supply the rectangular wave voltage to the light source circuit, the rectangular wave voltage having an amplitude equal to a voltage value of the DC voltage outputted from the DC power supply.

13. The light output control device of claim 9, wherein the switching device, the multiple signal input ports, the signal selection circuit, and the control circuit are mounted on a circuit board, and each of the multiple signal input ports is arranged on an end of the circuit board.

14. The light output control device of claim 9, wherein
at least one of the multiple kinds of light output control signals is a signal having a variable magnitude that varies continuously with a desired light output level of the light source circuit.

15. An illumination system, comprising:
the light output control device of claim 9; and
the light source circuit including the semiconductor light emitting element.

16. A facility apparatus, comprising:
the light output control device of claim 9;
the light source circuit including the semiconductor light emitting element; and
a facility apparatus body that holds the light source circuit and the light output control device.

* * * * *